US009218587B2

(12) United States Patent
Isogai et al.

(10) Patent No.: US 9,218,587 B2
(45) Date of Patent: Dec. 22, 2015

(54) INFORMATION-PROVIDING METHOD, AND INFORMATION-PROVIDING SYSTEM

(71) Applicant: Panasonic Intellectual Property Corporation of America, Torrance, CA (US)

(72) Inventors: Kazunori Isogai, Kyoto (JP); Motoji Ohmori, Osaka (JP); Yuji Unagami, Osaka (JP); Hideo Umetani, Osaka (JP); Michiko Sasagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/362,990

(22) PCT Filed: Sep. 26, 2013

(86) PCT No.: PCT/JP2013/005718
§ 371 (c)(1),
(2) Date: Jun. 5, 2014

(87) PCT Pub. No.: WO2014/050113
PCT Pub. Date: Apr. 3, 2014

(65) Prior Publication Data
US 2014/0365345 A1 Dec. 11, 2014

Related U.S. Application Data

(60) Provisional application No. 61/712,565, filed on Oct. 11, 2012, provisional application No. 61/707,169, filed on Sep. 28, 2012.

(51) Int. Cl.
*G06Q 10/00* (2012.01)
*G06Q 10/08* (2012.01)
(Continued)

(52) U.S. Cl.
CPC .......... *G06Q 10/087* (2013.01); *G06Q 30/0601* (2013.01); *H04L 67/10* (2013.01)

(58) Field of Classification Search
None
See application file for complete search history.

(56) References Cited

U.S. PATENT DOCUMENTS 8,521,844 B2 * 8/2013 Yoshida et al. ............... 709/219
2004/0054752 A1   3/2004 Takagi et al.
(Continued)

FOREIGN PATENT DOCUMENTS

JP     2002-230278     8/2002
JP     2002-288482     10/2002
(Continued)

OTHER PUBLICATIONS

International Search Report issued Oct. 22, 2013 in International (PCT) Application No. PCT/JP2013/005718.

*Primary Examiner* — Fateh M Obaid
(74) *Attorney, Agent, or Firm* — Wenderoth, Lind & Ponack, L.L.P.

(57) ABSTRACT

An information-providing method provides a notification relating to an item owned by a user in accordance with change in condition of the item. The information-providing method is implemented on a computer system that stores therein notifications that are each linked to one of a plurality of levels expressing possible conditions of the item. In the information-providing method, condition information is acquired which indicates change in condition of the item resulting from aging or use. Judgment is performed as to whether a current time is a provision time at which a notification is to be provided to the user. Upon judging affirmatively, a level matching condition of the item at the provision time is selected from among the levels, based on the condition information, and a notification linked to the selected level is determined to be the notification that is provided.

9 Claims, 35 Drawing Sheets

(51) Int. Cl.
*H04L 29/08* (2006.01)
*G06Q 30/06* (2012.01)

(56) References Cited

U.S. PATENT DOCUMENTS

2013/0275332 A1* 10/2013 Bennett et al. ............... 705/36 R
2014/0199961 A1* 7/2014 Mohammed et al. .......... 455/406
2014/0199962 A1* 7/2014 Mohammed et al. .......... 455/406
2014/0278564 A1* 9/2014 Smith et al. ....................... 705/4

FOREIGN PATENT DOCUMENTS

| | | |
|---|---|---|
| JP | 2003-030421 | 1/2003 |
| JP | 2003-185327 | 7/2003 |
| JP | 2003-271712 | 9/2003 |
| JP | 2004-348236 | 12/2004 |
| JP | 2006-170619 | 6/2006 |
| JP | 2007-001751 | 1/2007 |
| JP | 2010-257271 | 11/2010 |

* cited by examiner

FIG. 4

| Store name | Item name | Production /harvest date | Store display date | Display information | Stock number | Provider | Expiry /best before /use-by date |
|---|---|---|---|---|---|---|---|
| Supermarket aaa | Tomato | 2013/7/22 | 2013/7/23 | Store refrigerator | 5 | Company AJ | 2013/7/30 |
| | Pizza | 2013/5/31 | 2013/7/3 | Store refrigerator | 8 | Company SM | 2013/10/31 |
| | Ice-cream | 2013/5/8 | 2013/6/30 | Store freezer | 10 | Company AJ | 2014/5/7 |
| | ... | ... | ... | ... | ... | ... | ... |

FIG. 5

| Item name | Recipe name | Deterioration level | Ingredients list (one portion) | Preparation instructions |
|---|---|---|---|---|
| Tomato | Tomato and eggplant cheese bake | Level 1-2 | Tomato: 1<br>Eggplant: 1<br>Cheese slice: 1 | Cut the tomato into eighths.<br>: : |
| | Tomato stew | Level 2-3 | Tomato: 2<br>Carrot: 1/2<br>Potato: 1 | Roughly chop the carrot and the potato.<br>: : |
| | Tomato and egg Chinese stir-fry | Level 1-2 | Tomato: 1<br>Egg: 1 | Crack and beat the egg.<br>: : |
| ... | ... | ... | ... | ... |
| ... | ... | ... | ... | ... |

| Store name | Purchaser (user ID) | Item name | Purchase date | Production /harvest date | Expiry /best before /use-by date | Purchase amount /number |
|---|---|---|---|---|---|---|
| Supermarket aaa | U001 | Tomato | 2013/7/23 18:30 | 2013/7/22 | 2013/7/30 | 3 |
| | U001 | Pork | 2013/7/23 18:30 | 2013/7/22 | 2013/7/27 | 200 g |
| | U002 | Bread | 2013/7/23 14:15 | 2013/7/23 | 2014/7/26 | 1 |
| | ... | ... | ... | ... | ... | ... |

FIG. 7

| User ID | Item name | Image | Image capture date | Item amount | Storage location | Add button |
|---|---|---|---|---|---|---|
| U001 | Tomato | 001.jpg | 2013/7/23 | 3050 g | Middle | Yes |
| | Milk | 002.jpg | 2013/7/23 | 3200 g | Bottom | No |
| | Pork | 003.jpg | 2013/7/23 | 200 g | Meat draw | Yes |
| | Tomato | 004.jpg | 2013/7/26 | 1000 g | Middle | No |
| | ... | ... | ... | ... | ... | ... |

FIG.8

| User ID | Item name | Purchase date | Production /harvest date | Expiry /best before /use-by date | Purchase location | Purchase amount /number | Remaining proportion | Update date |
|---|---|---|---|---|---|---|---|---|
| U001 | AQ Curry | 2013/6/23 | 2013/4/22 | 2015/4/22 | Supermarket aaa | 4 | 50% | 2013/6/23 |
| | Pork | 2013/7/23 | 2013/7/22 | 2014/7/27 | Supermarket aaa | 200 g | 100% | 2013/7/25 |
| | Ham cutlet | 2013/7/23 | 2013/7/23 | 2013/7/26 | Supermarket zzz | 5 | 60% | 2013/7/23 |
| | Tomato | 2013/7/23 | 2013/7/22 | 2013/7/30 | Supermarket aaa | 3 | 33% | 2013/7/26 |
| | ... | ... | ... | ... | ... | ... | ... | ... |

FIG. 9
| Item name | Deterioration level | | | |
|---|---|---|---|---|
| | Level 1 | Level 2 | Level 3 | ... |
| Tomato | 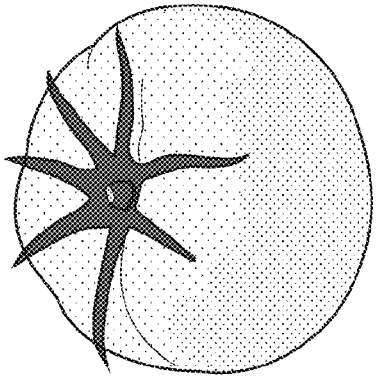 | 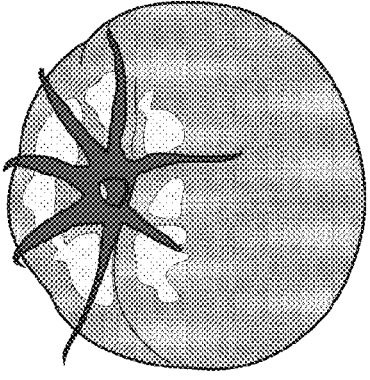 | 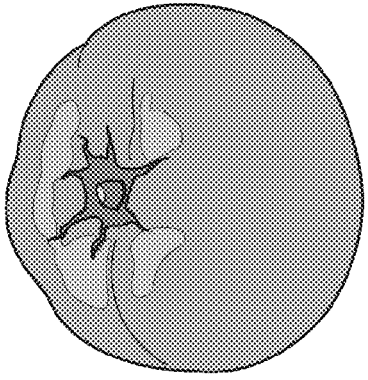 | ... |
| Raw fish | 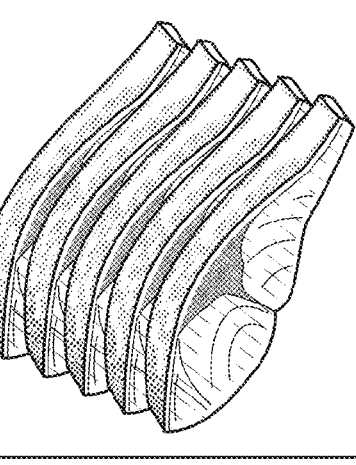 | 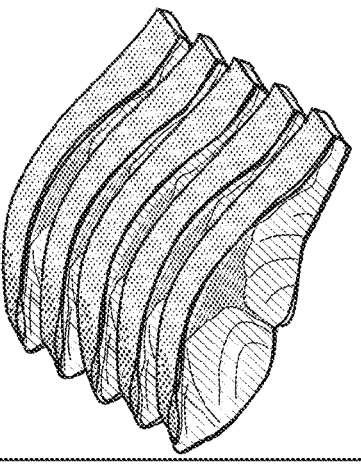 | 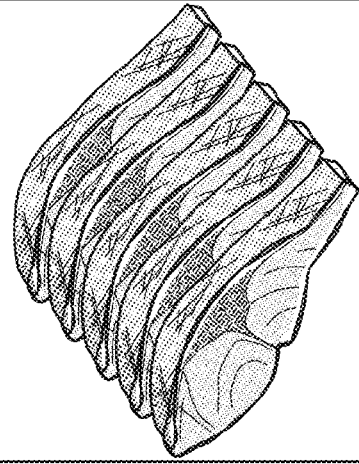 | ... |

| T1201 Store name | T1202 Item name | T1203 Store display date | T1204 Display location | T1205 Stock number | T1206 Provider | T1207 Color | T1208 Coordination color | T1209 Coordination item name |
|---|---|---|---|---|---|---|---|---|
| Boutique ABZ | T-shirt | 2013/7/23 | Store shelf | 5 | Company AJ | Blue | Black | Skirt (T1250) |
| | T-shirt | 2013/7/3 | Store shelf | 8 | Company SM | White | Yellow | Trousers |
| | Skirt | 2013/6/30 | Store shelf | 10 | Company AJ | Orange | Navy blue | T-shirt |
| | ... | ... | ... | ... | ... | ... | ... | ... |

| Store name | Purchaser (user ID) | Item name | Purchase date | Purchase number |
|---|---|---|---|---|
| Boutique ABZ | U001 | T-shirt | 2013/7/23 | 1 |
| | | Skirt | 2013/7/23 | 1 |
| | U002 | T-shirt | 2013/7/23 | 1 |
| | ⋮ | ⋮ | ⋮ | ⋮ |

| User ID | Item name | Image | Image capture date | Add button |
|---|---|---|---|---|
| U001 | T-shirt | 001.jpg | 2013/7/23 | Yes |
| | Skirt | 002.jpg | 2013/7/23 | No |
| | Socks | 003.jpg | 2013/7/23 | Yes |
| | T-shirt | 004.jpg | 2013/7/26 | No |
| | ⋮ | ⋮ | ⋮ | ⋮ |

| User ID | Item name | Purchase date | Purchase location |
|---|---|---|---|
| U001 | T-shirt | 2013/6/23 | Boutique ABZ |
| | Skirt | 2013/7/23 | Boutique ABZ |
| | Socks | 2013/7/23 | Boutique ABZ |
| | ⋮ | ⋮ | ⋮ |

FIG. 35

| Date | Top | Trousers/skirt | Belt | Bag | Watch | Hair accessory | Earrings |
|---|---|---|---|---|---|---|---|
| 2011/10/1 | A | a | v | v | G | P | N |
| 2011/10/2 | B | a | v | v | G | Q | N |
| 2011/10/3 | A | c | s | S | G | R | — |
| 2011/10/4 | C | a | v | v | — | — | N |
| 2011/10/5 | A | a | v | v | — | Q | — |
| 2011/10/6 | D | b | s | S | H | R | — |
| 2011/10/7 | A | a | v | v | H | — | M |
| 2011/10/8 | A | a | v | v | H | Q | — |
| 2011/10/9 | E | c | s | S | H | — | M |
| ... | ... | ... | ... | ... | ... | ... | ... |

INFORMATION-PROVIDING METHOD, AND INFORMATION-PROVIDING SYSTEM

This application claims benefit to the provisional U.S. application No. 61/707,169, filed Sep. 28, 2012, and No. 61/712,565, filed Oct. 11, 2012.

TECHNICAL FIELD

The present invention relates to an information-providing method and an information-providing system for providing a user with a notification which relates to an item owned by the user and which indicates information in accordance with change in condition of the item.

BACKGROUND OF INVENTION

Background Art

A system currently exists for providing a user with a notification relating to an item owned by the user. For example, a housewife or other person responsible for cooking may find it troublesome to plan meals. In order to reduce the burden of meal planning, a system has been disclosed for providing a user with a notification which is recipe information for a recipe that uses cooking ingredients owned by the user (Patent Literature 1).

As another example of a system that provides a user with a notification relating to an item owned thereby, a system has been disclosed that provides a user with a coordination suggestion based on items of clothing owned by the user (Patent Literature 2). Through use of the system disclosed in Patent Literature 2, the user is informed for a certain item of clothing owned thereby, such as a top, what other items of clothing, such as trousers or skirts, can be coordinated therewith, and thus it is easy for the user to coordinate other items of clothing with the top.

CITATION LIST

Patent Literature

[Patent Literature 1] Japanese Patent Application Publication No. 2003-271712
[Patent Literature 2] Japanese Patent Application Publication No. 2002-288482

SUMMARY OF INVENTION

Unfortunately, quality of an item owned by a user may decrease over time.

For example, when the item owned by the user is a cooking ingredient, freshness of the cooking ingredient decreases day by day. Unfortunately, depending on which recipe is to be prepared, it may be essential that fresh cooking ingredients are used. Consequently, when the art disclosed in Patent Literature 1 is adopted, the user may be provided with a recipe for which use of a cooking ingredient in a fresh state is essential, regardless of whether or not freshness of the cooking ingredient owned by the user has deteriorated.

On the other hand, if the item owned by the user is an item of clothing (for example, a top), color of the item of clothing gradually fades each time the item of clothing is washed. Consequently, when the art disclosed in Patent Literature 2 is adopted, the user is presented with a suggestion of another item of clothing (for example, a skirt) that can be coordinated with the item of clothing owned by the user (i.e., the top), regardless of whether or not color of the top has faded. In the above situation, even if the user were to purchase a new skirt which is suggested, the new skirt would not be a particularly good match if coordinated with a faded top.

In other words, the arts disclosed in Patent Literature 1 and Patent Literature 2 are unable to provide optimal information to a user in a situation in which, at a time at which a notification is to be provided to the user, condition of an item owned by the user has changed, relative to original condition thereof, for example due to degradation in quality of the item.

In consideration of the above, an objective of the present invention is to provide an information-providing method and an information-providing system that provides a user with a notification relating to an item owned thereby, in accordance with change in condition of the item.

One aspect of the present invention is an information-providing method for implementing, on a computer system, a notification service that provides a notification relating to an item owned by a user, wherein the computer system stores therein a plurality of notifications that are each linked to one of a plurality of levels expressing possible conditions of the item, the plurality of levels including at least a first level at which condition of the item is suitable for using the item as a material for a certain objective and a second level at which condition of the item is not suitable for using the item as the material, and the notifications indicate suggestions to be provided to the user in accordance with a level, among the plurality of levels, corresponding to condition of the item, the information-providing method comprising: an acquisition step of acquiring condition information indicating change in condition of the item resulting from aging or use thereof; a judgment step of judging whether a current time is a provision time at which a notification is to be provided to the user; and a determination step of, upon judging affirmatively in the judgment step, selecting a level that matches condition of the item at the provision time from among the plurality of levels, based on the condition information, and determining a notification linked to the level which is selected, to be the notification that is provided to the user.

Through the configuration described above, the information-providing method ensures that the notification which is provided to the user is information in accordance with the level corresponding to condition of the item at the provision timing, after change in condition of the item has occurred.

BRIEF DESCRIPTION OF DRAWINGS

FIG. 4 illustrates one example of data structure of a vending information table T200.

FIG. 5 illustrates one example of data structure of a recipe information table T300.

FIG. 6 illustrates one example of data structure of a purchase information table T400.

FIG. 7 illustrates one example of data structure of an item information table T500.

FIG. 8 illustrates one example of data structure of a stock information table T600.

FIG. 9 illustrates one example of data structure of a quality pattern table T700.

FIG. 21 illustrates one example of data structure of a vending information table T1200.

FIG. 22 illustrates one example of data structure of a purchase information table T1400.

FIG. 23 illustrates one example of data structure of an item information table T1500.

FIG. 24 illustrates one example of data structure of a stock information table T1600.

FIG. 35 illustrates one example of data structure of a usage history information table T3000.

Figure 1:
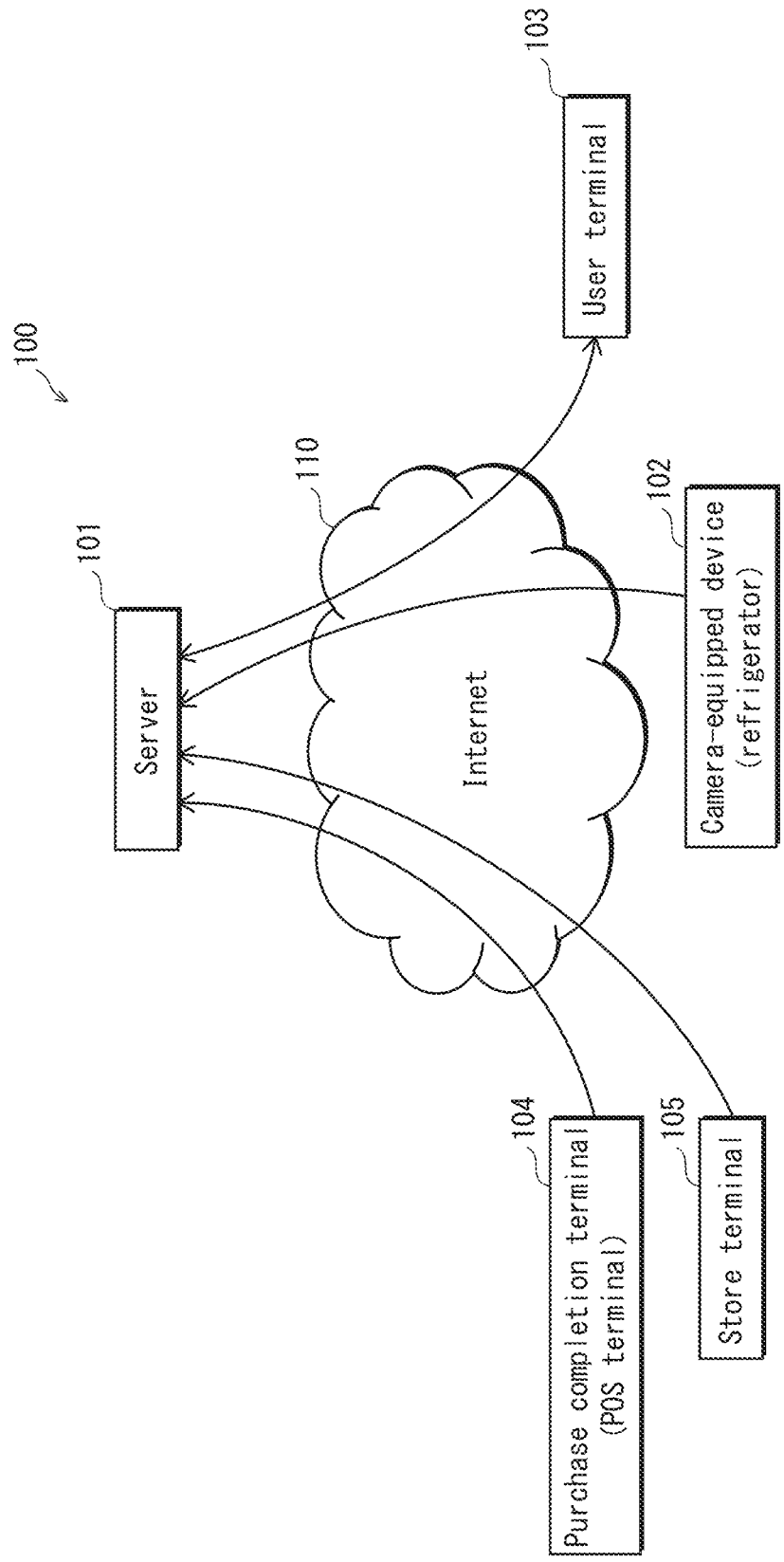
FIG. 1 illustrates an overview of an information-providing system 100.

DETAILED DESCRIPTION OF INVENTION (Knowledge Forming the Basis of the Present Invention)

As explained above, depending on condition of a cooking ingredient at a time of use thereof, the cooking ingredient may not be suitable for use in certain recipes. For example, in the case of a tomato that is fully-ripe and is becoming soft, providing a recipe for tomato sauce spaghetti in which the tomato is crushed can be considered to be appropriate, but providing a recipe for a salad in which the tomato is used with other vegetables in a largely unmodified state is not appropriate.

Unfortunately, the system disclosed in Patent Literature 1 provides recipes without taking into account condition of a cooking ingredient owned by a user, and consequently may also provide recipes which are inappropriate for the cooking ingredient.

Furthermore, the system disclosed in Patent Literature 2 provides coordination suggestions relating to an item of clothing owned by a user, without taking into account condition of the item of clothing. Consequently, even when the item of clothing owned by the user is faded in color, the system disclosed in Patent Literature 2 may suggest coordination of a new item of clothing with the faded item of clothing. Unfortunately, a suggestion such as described above involves coordinating an item of clothing which has faded relative to original color and brightness thereof, with an item of clothing which has not faded relative original color and brightness thereof. Therefore, such a suggestion is inappropriate.

The inventors achieved the present invention after dedicated investigation into a method for providing a notification relating to an item owned by a user, which indicates information in accordance with change in condition of the item.

One aspect of the present invention is an information-providing method for implementing, on a computer system, a notification service that provides a notification relating to an item owned by a user, wherein the computer system stores therein a plurality of notifications that are each linked to one of a plurality of levels expressing possible conditions of the item, the plurality of levels including at least a first level at which condition of the item is suitable for using the item as a material for a certain objective and a second level at which condition of the item is not suitable for using the item as the material, and the notifications indicate suggestions to be provided to the user in accordance with a level, among the plurality of levels, corresponding to condition of the item, the information-providing method comprising: an acquisition step of acquiring condition information indicating change in condition of the item resulting from aging or use thereof; a judgment step of judging whether a current time is a provision time at which a notification is to be provided to the user; and a determination step of, upon judging affirmatively in the judgment step, selecting a level that matches condition of the item at the provision time from among the plurality of levels, based on the condition information, and determining a notification linked to the level which is selected, to be the notification that is provided to the user.

The following explains an embodiment of the present invention.

1. First Embodiment 1.1 Information-Providing System 100

An information-providing system 100 is a system for providing a user with a notification that is in accordance with change in condition of an item, such as a cooking ingredient, owned by the user.

As illustrated in FIG. 1, the information-providing system 100 includes a server 101, a camera-equipped device 102, a user terminal 103, a purchase completion terminal 104, and a store terminal 105.

The server 101 manages each item that is stored in the camera-equipped device 102 by a user. The server 101 receives a request for a notification relating to an item owned by the user from the user terminal 103, via the Internet 110. The server 101 provides the notification to the user based on change in condition (for example, change in quality) of the item owned by the user, which is being managed by the server 101.

The camera-equipped device 102 is for example a refrigerator having a camera connected thereto. The camera of the camera-equipped device 102 captures an image of an item when the item is put-in or taken out of the camera-equipped device 102, or may simply capture an image of the item each time a door of the camera-equipped device 102 is opened. Each image captured by the camera is transmitted to the server 101, via the Internet 110, for management by the server 101.

The user terminal 103 transmits an instruction to the server 101, via the Internet 110, requesting a notification relating to an item. When the user terminal 103 receives a notification from the server 101 relating to an item for which a request has been made, the user terminal 103 presents the notification to the user by displaying contents of the notification.

The purchase completion terminal 104 is for example a point of sale (POS) terminal located in a store. The purchase completion terminal 104 transmits information relating to each item purchased by a user to the server 101 (herein referred to as purchase information), via the Internet 110.

The store terminal 105 is a terminal that manages information relating to each item sold by a store (herein referred to as vending information). The store terminal 105 transmits the vending information to the server 101, via the Internet 110, in order that the server 101 can use the vending information in acquisition of a notification, for example through generation of the notification.

1.2 Server 101

The following explains configuration of the server 101.

Figure 2:
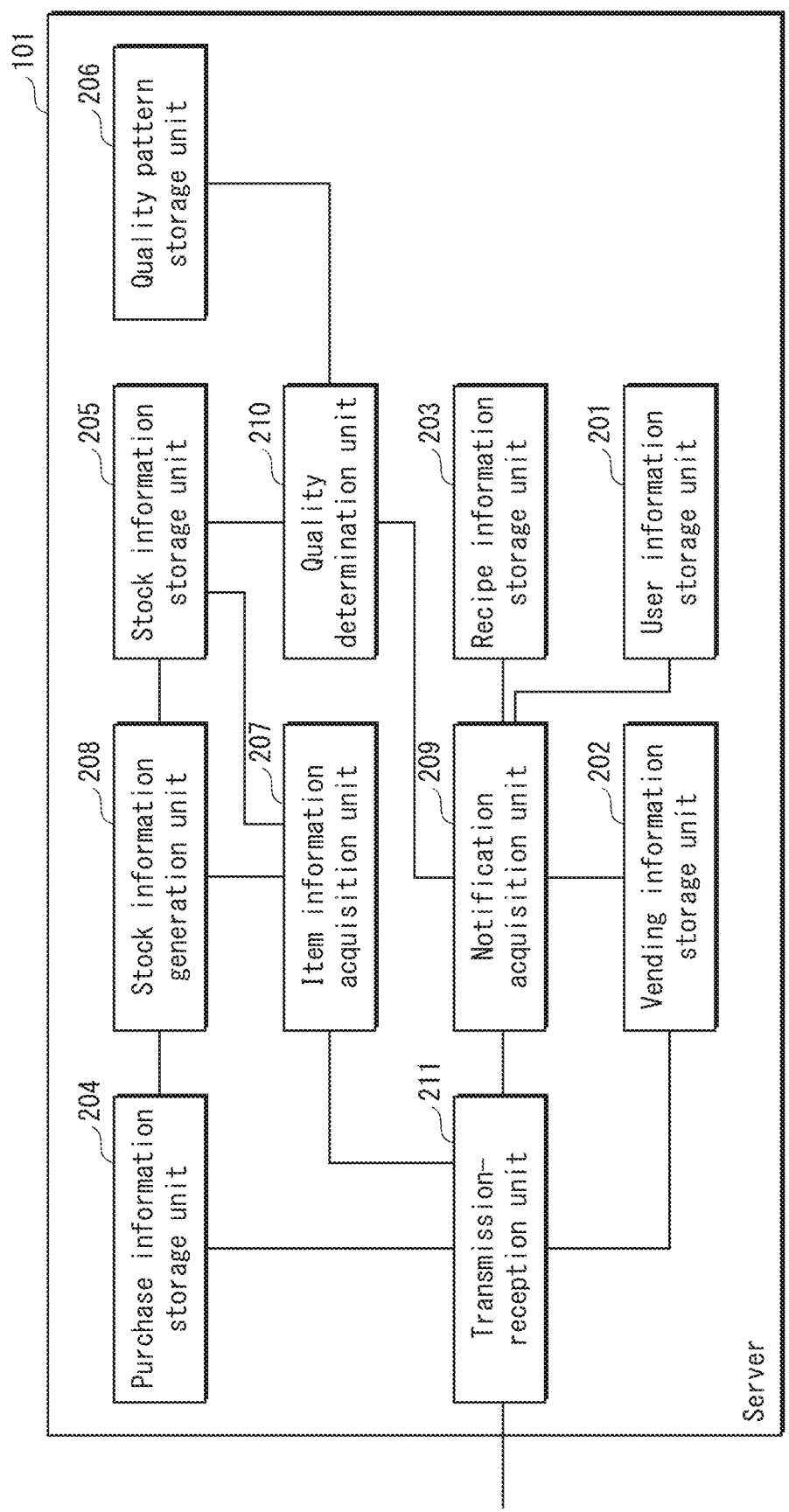
FIG. 2 is a block diagram illustrating configuration of a server 101.

As illustrated in FIG. 2, the server 101 is configured by a user information storage unit 201, a vending information storage unit 202, a recipe information storage unit 203, a purchase information storage unit 204, a stock information storage unit 205, a quality pattern storage unit 206, an item information acquisition unit 207, a stock information generation unit 208, a notification acquisition unit 209, a quality determination unit 210, and a transmission-reception unit 211.

The server 101 includes a processor, a memory and a network interface card (NIC). Functions of the item information acquisition unit 207, the stock information generation unit 208, the notification acquisition unit 209, and the quality determination unit 210 are implemented through execution by the processor of a program stored in the memory. The server 101 performs reception and transmission of information via the Internet 110 through use of the NIC.

(1) User Information Storage Unit 201

The user information storage unit 201 is a memory region for storing information relating to each user (herein referred to as user information). The user information storage unit 201 includes a user information table T100.

Figure 3:
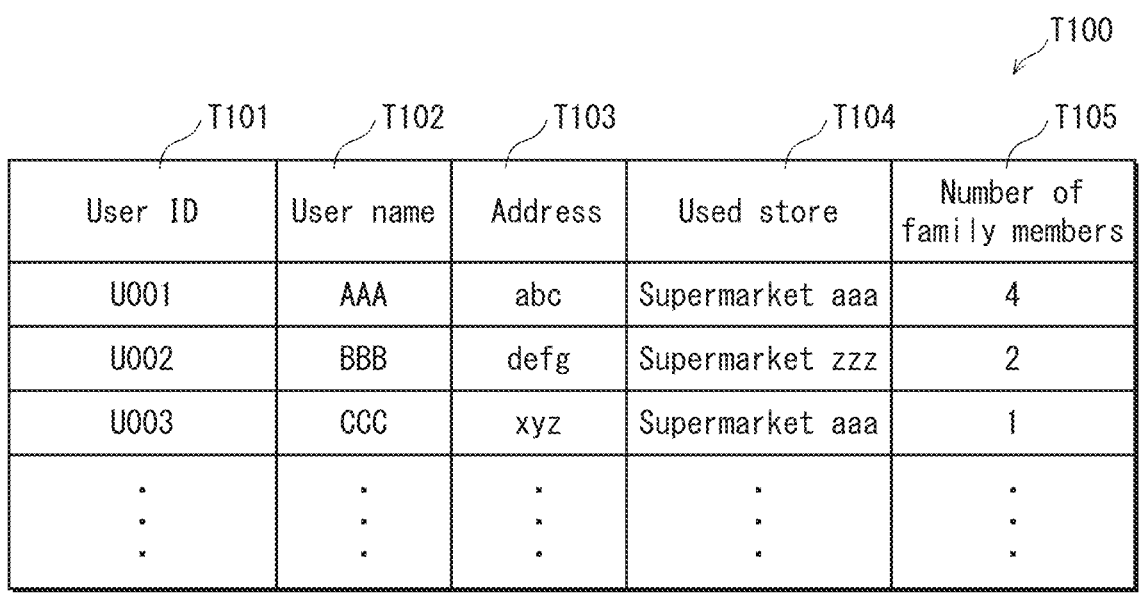
FIG. 3 illustrates one example of data structure of a user information table T100.

As illustrated in FIG. 3, the user information table T100 stores one or more sets of user information, each including a user ID T101, a user name T102, an address T103, a used store T104, and a number of family members T105.

The user ID T101 indicates an identification code for identifying a user that uses the information-providing system 100.

The user name T102 indicates a name of the user identified by the user ID.

The address T103 indicates an address of the user.

The used store T104 indicates a name of a store that the user frequently uses in order to purchase items (i.e., cooking ingredients).

The number of family members T105 indicates a number of members in the user's family, inclusive of the user.

(2) Vending Information Storage Unit 202

The vending information storage unit 202 is a memory region storing, for each store, vending information relating to each item sold by the store. The vending information storage unit 202 includes a vending information table T200.

As illustrated in FIG. 4, the vending information table T200 stores one or more sets of vending information, each including a store name T201, an item name T202, a production/harvest date T203, a store display date T204, display information T205, a stock number T206, a provider T207, and an expiry/best before/use-by date T208.

The store name T201 indicates a name of a store.

The item name T202 indicates a name of an item that is sold by the store.

The production/harvest date T203 indicates a production date or a harvest date of the item indicated by the corresponding item name.

The store display date T204 indicates a date on which the item indicated by the corresponding item name is displayed in the store.

The display information T205 indicates a location at which the item indicated by the corresponding item name is displayed.

The stock number T206 indicates a number of the item indicated by the corresponding item name which the store has in stock.

The provider T207 indicates a provider from which the store obtains the item indicated by the corresponding item name.

The expiry/best before/use-by date T208 indicates an expiry date, a best before date, or a use-by date of the item indicated by the corresponding item name.

(3) Recipe Information Storage Unit 203

The recipe information storage unit 203 is a memory region for storing information relating to each recipe (herein referred to as recipe information). The recipe information storage unit 203 includes a recipe information table T300.

As illustrated in FIG. 5, the recipe information table T300 stores one or more sets of recipe information, each including an item name T301, a recipe name T302, a deterioration level T303, an ingredients list T304, and preparation instructions T305.

The item name T301 indicates a name of an item that is used in a recipe.

The recipe name T302 indicates a name of the recipe that uses the item indicated by the corresponding item name.

The deterioration level T303 indicates, for the item indicated by the corresponding item name, a degree of deterioration (deterioration level) of the item at which the item is suitable for use in the recipe indicated by the corresponding recipe name. In terms of deterioration level, level 1 indicates that condition of an item is at an optimum level, while increasingly high level numbers indicate worsening in condition of the item.

The ingredients list T304 indicates cooking ingredients and amounts (per one person portion) thereof that are required in order to prepare the recipe indicated by the corresponding recipe name.

The preparation instructions T305 indicate an order of steps for preparing the recipe indicated by the corresponding recipe name.

(4) Purchase Information Storage Unit 204

The purchase information storage unit 204 is a memory region for storing, for each store, purchase information relating to each item purchased by a user. The purchase information storage unit 204 includes a purchase information table T400.

As illustrated in FIG. 6, the purchase information table T400 stores one or more sets of purchase information, each including a store name T401, a purchaser T402, an item name T403, a purchase date T404, a production/harvest date T405, an expiry/best before/use-by date T406, and a purchase amount/number T407.

The store name T401 indicates a name of a store.

The purchaser T402 indicates a user who has made a purchase at the store. Note that the purchaser is indicated by a user ID in the present embodiment.

The item name T403 indicates a name of an item purchased by the user.

The purchase date T404 indicates a date and time at which the user purchased the item.

The production/harvest date T405 indicates a production date or a harvest date of the item purchased by the user.

The expiry/best before/use-by date T406 indicates an expiry date, a best before date, or a use-by date of the item purchased by the user.

The purchase amount/number T407 indicates an amount of the item or a number of the item purchased by the user.

(5) Stock Information Storage Unit 205

The stock information storage unit 205 is a memory region for storing information relating to each item owned by a user. The stock information storage unit 205 includes an item information table T500 and a stock information table T600.

(5-1) Item Information Table T500

The item information table T500 stores information that indicates condition of each item owned by a user (herein referred to as item information). As illustrated in FIG. 7, the item information table T500 stores one or more sets of item information, each including a user ID T501, an item name T502, an image T503, an image capture date T504, an item amount T505, a storage location T506, and an add button T507.

The user ID T501 indicates an identification code that identifies a user.

The item name T502 indicates a name of an item owned by the user.

The image T503 is an image of the item owned by the user which corresponds to the item name.

The image capture date T504 indicates a date on which the image was captured.

The item amount T505 indicates an amount of the item owned by the user which corresponds to the item name.

The storage location T506 indicates a storage location within the camera-equipped device 102 of the item owned by the user which corresponds to item name.

The add button T507 indicates whether or not an add button of the camera-equipped device 102, which is explained further below, has been pressed. The add button T507 showing "Yes" indicates that the add button of the camera-equipped device 102 has been pressed. In such a situation, the add button T507 indicates that the item corresponding to the item name has become a target for stock management. On the other hand, the add button T507 showing "No" indicates that the add button of the camera-equipped device 102 has not been pressed. In such a situation, the add button T507 indicates that the item corresponding to the item name is already a target for stock management.

Each time the camera of the camera-equipped device 102 captures an image, the camera-equipped device 102 transmits a set of item information to the server 101. The server 101 receives the item information and adds the item information to the item information table T500. For example, as illustrated in FIG. 7, the item information table T500 stores a set of item information T510 including an image "001.jpg" captured of an item "Tomato" by the camera of the camera-equipped device 102 on "2013/7/23". As can be seen from FIG. 7, a set of item information T511 including an image "004.jpg" captured of the same item "Tomato" on "2013/7/26" has been added to the item information table T500 after the set of item information T510.

(5-2) Stock Information Table T600

The stock information table T600 stores information such as purchase date and the like, relating to each item owned by a user (herein referred to as stock information). As illustrated in FIG. 8, the stock information table T600 stores one or more sets of stock information, each including a user ID T601, an item name T602, a purchase date T603, a production/harvest date T604, an expiry/best before/use-by date T605, a purchase location T606, a purchase amount/number T607, a remaining proportion T608, and an update date T609.

The user ID T601 indicates an identification code that identifies a user.

The item name T602 indicates a name of an item owned by the user.

The purchase date T603 indicates a date on which the user purchased the item indicated by the item name T602.

The production/harvest date T604 indicates a production date or a harvest date of the item purchased by the user.

The expiry/best before/use-by date T605 indicates an expiry date, a best before date, or a use-by date of the item purchased by the user.

The purchase location T606 indicates a store at which the user purchased the item indicated by the item name T602.

The purchase amount/number T607 indicates an amount of the item or number of the item purchased by the user.

The remaining proportion T608 indicates a remaining proportion of the item indicated by the item name T602. In the present embodiment the remaining proportion is a percentage indicating an amount of the item in stock when item information relating to the item is most recently received, relative to an amount of the item in stock when the item initially became a target for stock management. The remaining proportion is updated each time the item indicated by the item name T602 is used.

The update date T609 indicates a date on which the remaining proportion has been updated.

(6) Quality Pattern Storage Unit 206

The quality pattern storage unit 206 is a memory region for storing reference images which are used as targets for comparison with an image included in a set of item information, in order to determine condition (deterioration level) of an item owned by a user. The quality pattern storage unit 206 includes a quality pattern table T700. Each of the reference images is information indicating effect on external appearance of an item when deterioration of the item occurs to a degree indicated by a corresponding deterioration level.

As illustrated in FIG. 9, the quality pattern table T700 stores one or more sets of information, each including an item name T701 and a deterioration level T702.

The item name T701 indicates a name of an item owned by a user.

As illustrated in FIG. 9, the deterioration level T702 is categorized into levels 1, 2 and 3. The deterioration level T702 includes reference images for the item corresponding to the respective deterioration levels. In the present embodiment, an increase in level number is accompanied by an increase in deterioration of a corresponding item. When deterioration level exceeds level 3, consumption of the corresponding item may adversely affect a user, for example by causing food poisoning. Note that a group of images composed of reference images for respective deterioration levels of a certain item is referred to as a deterioration pattern group.

(7) Item Information Acquisition Unit 207

The item information acquisition unit 207 acquires item information from the camera-equipped device 102, via the Internet 110. When the item information acquisition unit 207 acquires the item information, the item information acquisition unit 207 stores the item information in the item information table T500 of the stock information storage unit 205.

The item information acquisition unit 207 also outputs the item information acquired thereby to the stock information generation unit 208.

(8) Stock Information Generation Unit 208

The stock information generation unit 208 generates stock information using item information output from the item information acquisition unit 207 for an item owned by a user, and purchase information relating to the user in the purchase information storage unit 204.

More specifically, the stock information generation unit 208 has functions explained below.

When the add button T507 included in a set of item information received by the item information acquisition unit 207 indicates "Yes", the stock information generation unit 208 acquires a set of purchasing information from the purchase information storage unit 204 which includes a user ID and an item name that respectively match a user ID and an item name included in the received item information. The stock information generation unit 208 generates a set of stock information using the item information received from the item information acquisition unit 207 and the purchase information acquired from the purchase information storage unit 204. The stock information generation unit 208 stores the stock information which is generated in the stock information table T600 of the stock information storage unit 205.

When the add button T507 included in a set of item information received from the item information acquisition unit 207 indicates "No", the stock information generation unit 208 acquires a set of stock information from the stock information table T600 of the stock information storage unit 205 which includes a user ID and an item name that respectively match a user ID and an item name included in the received item information. The stock information generation unit 208 also acquires a set of item information from the item information table T500 which includes a user ID and an item name that respectively match the user ID and the item name included in the received item information. Note that when one or more set of item information in the item information table T500 include the same user ID and the same item name, the stock information generation unit 208 acquires a set of item information, among the one or more sets of item information, for which the add button T507 included therein indicates "Yes", and which includes an image capture date closest to an image capture date included in the received item information. In other words, the stock information generation unit 208 acquires a set of item information which relates to the same item as indicated by the received item information, and for which the add button T507 indicates that the add button has been pressed. The stock information generation unit 208 calculates a remaining proportion based on respective amounts included in the received item information and the acquired item information. For example, the remaining proportion can be calculated by dividing the "amount included in the received item information" by the "amount included in the item information acquired from the item information table T500". The stock information generation unit 208 updates a remaining proportion included in the set of stock information acquired from the stock information table T600 so as to match the remaining proportion which is calculated. The stock information generation unit 208 also updates an update date included in the acquired stock information. The stock information table T600 is updated through the process explained above.

(9) Notification Acquisition Unit 209

The notification acquisition unit 209 acquires a notification in accordance with deterioration level of an item owned by a user. The notification acquisition unit 209 provides the notification to the user via the Internet 110.

More specifically, the notification acquisition unit 209 has functions explained below.

The notification acquisition unit 209 acquires a request from the user terminal 103, via the Internet 110, requesting a notification relating to an item owned by the user of the user terminal 103. The request includes a user ID which identifies the user requesting the notification and an item name indicating the item to which the request relates.

The notification acquisition unit 209 outputs the request, acquired from the user terminal 103, to the quality determination unit 210.

The notification acquisition unit 209 acquires a deterioration level from the quality determination unit 210 for the item, corresponding to the item name included in the request, which is owned by the user.

Based on the deterioration level, the notification acquisition unit 209 acquires a notification to be provided to the user, which relates to the item indicated by the item name included in the request. For example, in accordance with the deterioration level, the notification acquisition unit 209 can acquire the notification by generating a notification relating to the item, by acquiring, as the notification, recipe information from the recipe information storage unit 203 for a recipe using the item as an ingredient, or by acquiring, as the notification, information from the vending information storage unit 202 indicating a store that sells the item.

The notification acquisition unit 209 transmits the acquired notification to the user terminal 103 which made the request, via the Internet 110.

(10) Quality Determination Unit 210

The quality determination unit 210 determines condition (deterioration level) of an item owned by a user.

More specifically, the quality determination unit 210 has functions explained below.

When the quality determination unit 210 receives a request from the notification acquisition unit 209, the quality determination unit 210 acquires, from the quality pattern storage unit 206, a deterioration pattern group having an item name that matches an item name included in the received request.

The quality determination unit 210 also acquires, from the item information table T500 of the stock information storage unit 205, a set of item information which includes a user ID and an item name that respectively match a user ID and the item name included in the received request. Note that when one or more sets of item information in the item information table T500 include the same user ID and the same item name, the quality determination unit 210 acquires a set of item information including a most recent image capture date among the one or more sets of item information.

The quality determination unit 210 compares an image included in the acquired item information with the deterioration pattern group in order to determine deterioration level of an item for which a notification is requested. The quality determination unit 210 for example determines deterioration level of the item by judging which among corresponding items captured in images for deterioration levels 1 to 3 is most similar in terms of color to the item captured in the image included in the acquired item information. The quality determination unit 210 may for example alternatively judge whether color of the item captured in the image included in the acquired item information is similar to an intermediate color between colors corresponding to deterioration levels 1 and 2, or an intermediate color between colors corresponding to deterioration levels 2 and 3. The quality determination unit 210 may for example alternatively judge whether color of the item captured in the image included in the acquired item information is blacker than color corresponding to deterioration level 3.

Furthermore, when determining deterioration level, the quality determination unit 210 determines a current deterioration level of the item by adding a predetermined value to the determined deterioration level when an image capture date of the image included in the acquired item information is at least a predetermined number of days (for example, three days) prior to a date on which the request is received. More specifically, the quality determination unit 210 calculates a difference between the current date and the image capture date in terms of number of days, and multiplies the number of days by a factor of 0.1. The product of the aforementioned multiplication is added to the determined deterioration level in order to acquire the current deterioration level. For example, suppose a situation in which the difference between the current date and the image capture date is five days, and deterioration level 1.5, which is intermediate between deterioration level 1 and deterioration level 2, is determined to be the deterioration level of the item. Through the calculation method described above, deterioration level 2 is acquired as the current deterioration level in such a situation. Note that when the image capture date of the image included in the acquired item information is within the predetermined number of days of the date when the request is received, the quality determination unit 210 uses the deterioration level which is determined through the comparison described further above as the current deterioration level.

The quality determination unit 210 outputs, to the notification acquisition unit 209, the current deterioration level of the item which is acquired based on comparison with the deterioration pattern group.

(11) Transmission-Reception Unit 211

The transmission-reception unit 211 includes the NIC and performs transmission and reception of information between the server 101 and the camera-equipped device 102, the user terminal 103, the purchase completion terminal 104, and the store terminal 105, via the Internet 110.

More specifically, the transmission-reception unit 211 has functions explained below.

When the transmission-reception unit 211 receives item information from the camera-equipped device 102, via the Internet 110, the transmission-reception unit 211 outputs the item information to the item information acquisition unit 207.

When the transmission-reception unit 211 receives a request from the user terminal 103, via the Internet 110, the transmission-reception unit 211 outputs the request to the notification acquisition unit 209.

When the transmission-reception unit 211 receives purchase information from the purchase completion terminal 104, via the Internet 110, the transmission-reception unit 211 stores the purchase information in the purchase information table T400 of the purchase information storage unit 204.

When the transmission-reception unit 211 receives vending information from the store terminal 105, via the Internet 110, the transmission-reception unit 211 stores the vending information in the vending information table T200 of the vending information storage unit 202.

1.3 Camera-Equipped Device 102

The following explains configuration of the camera-equipped device 102.

Figure 10:
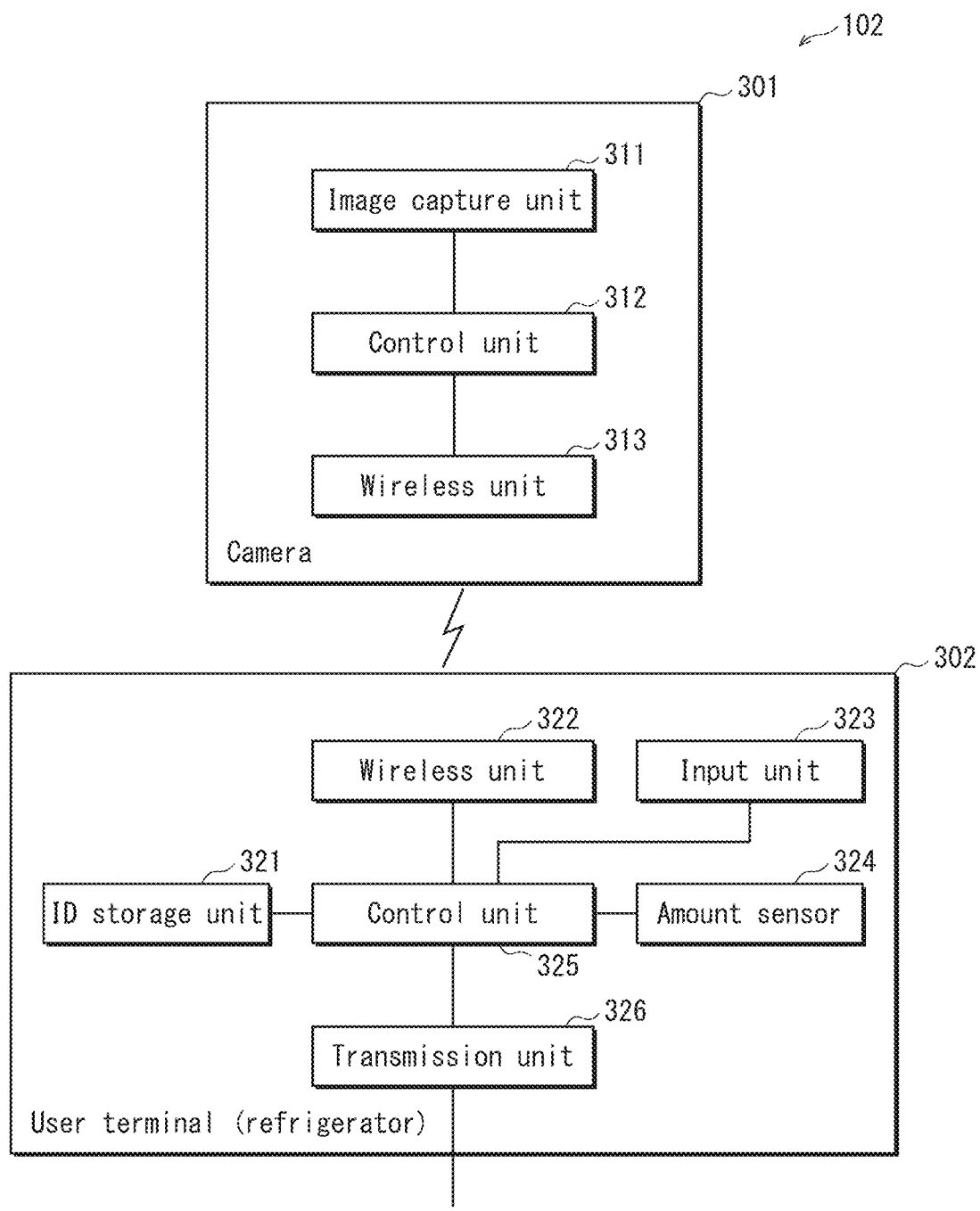
FIG. 10 is a block diagram illustrating configuration of a camera-equipped device 102.

The camera-equipped device 102 is for example a refrigerator having a camera connected thereto. As illustrated in FIG. 10, the camera-equipped device 102 includes a camera 301 and a user terminal (refrigerator) 302.

The camera 301 is for example a wearable camera which can be used while held in a hand of a user. As illustrated in FIG. 10, the camera 301 is configured by an image capture unit 311, a control unit 312, and a wireless unit 313. The camera 301 includes a processor and a memory, and implements functions of the control unit 312 through execution by the processor of a program stored in the memory.

As illustrated in FIG. 10, the user terminal (refrigerator) 302 is configured by an ID storage unit 321, a wireless unit 322, an input unit 323, an amount sensor 324, a control unit 325, and a transmission unit 326. The user terminal 302 includes a processor, a memory, and an NIC, and implements functions of the control unit 325 through execution by the processor of a program stored in the memory. The user terminal 302 uses the NIC to perform transmission and reception of information via the Internet 110.

The following explains each of the elements configuring the camera 301 and the user terminal 302.

(1) Image Capture Unit 311

The image capture unit 311 has an image capture function of capturing an image on an object.

More specifically, the image capture unit 311 can be operated by a user to capture an image of an item that is taken out of the user terminal (refrigerator) 302, an image of an item that is placed inside the user terminal 302, and an image of an item that is stored in the user terminal 302.

(2) Control Unit 312

The control unit 312 transmits each image captured by the image capture unit 311 to the user terminal 302, via the wireless unit 313.

(3) Wireless Unit 313

The wireless unit 313 includes a wireless circuit and performs wireless communication with the user terminal 302.

More specifically, the wireless unit 313 transmits each image output from the control unit 312, to the user terminal 302, through wireless communication.

(4) ID Storage Unit 321

The ID storage unit 321 is a memory region for storing an ID that identifies the user of the camera-equipped device 102.

(5) Wireless Unit 322

The wireless unit 322 includes a wireless circuit and performs wireless communication with the camera 301.

More specifically, the wireless unit 322 receives each image transmitted from the camera 301 through wireless communication.

(6) Input Unit 323

The input unit 323 has a text input function and includes the add button described further above.

The input unit 323 receives input of an item name for an item that is a target of an image captured by the camera 301. The input unit 323 outputs the received item name to the control unit 325.

When the add button is pressed by the user, the input unit 323 notifies the control unit 325 that the add button has been pressed.

(7) Amount Sensor 324

The amount sensor 324 is a sensor that measures an amount of an item stored inside the user terminal (refrigerator) 302.

More specifically, when an image is received from the camera 301 and input of an item name is received by the input unit 323, the amount sensor 324 measures change in stock amount and outputs the change in stock amount to the control unit 325.

(8) Control Unit 325

The control unit 325 has a function of controlling each function of the user terminal 302 and also has a function of keeping track of the date.

More specifically, the control unit 325 has functions explained below.

The control unit 325 receives an image from the camera 301 via the wireless unit 322 and receives an item name from the input unit 323. When the control unit 325 receives a change in stock amount from the amount sensor 324, the control unit 325 acquires the user ID from the ID storage unit 321 and also acquires the current date. The control unit 325 also uses the image received from the camera 301 in order to determine a storage location of an item captured in the image.

The control unit 325 sets the change in stock amount received from the amount sensor 324 as an amount of the item indicated by the item name received from the input unit 323. The control unit 325 generates, in accordance with whether or not the add button is pressed, a set of item information including the user ID, the current date, the item name, the image, the amount, and the storage location which have been acquired. The control unit 325 transmits the generated item information to the server 101, via the transmission unit 326.

(9) Transmission Unit 326

The transmission unit 326 includes the aforementioned NIC, and performs transmission and reception of information between the user terminal 302 and the server 101, via the Internet 110.

More specifically, the transmission unit 326 receives item information from the control unit 325 and transmits the item information to the server 101, via the Internet 110.

1.4 User Terminal 103

The following explains configuration of the user terminal 103.

Figure 11:
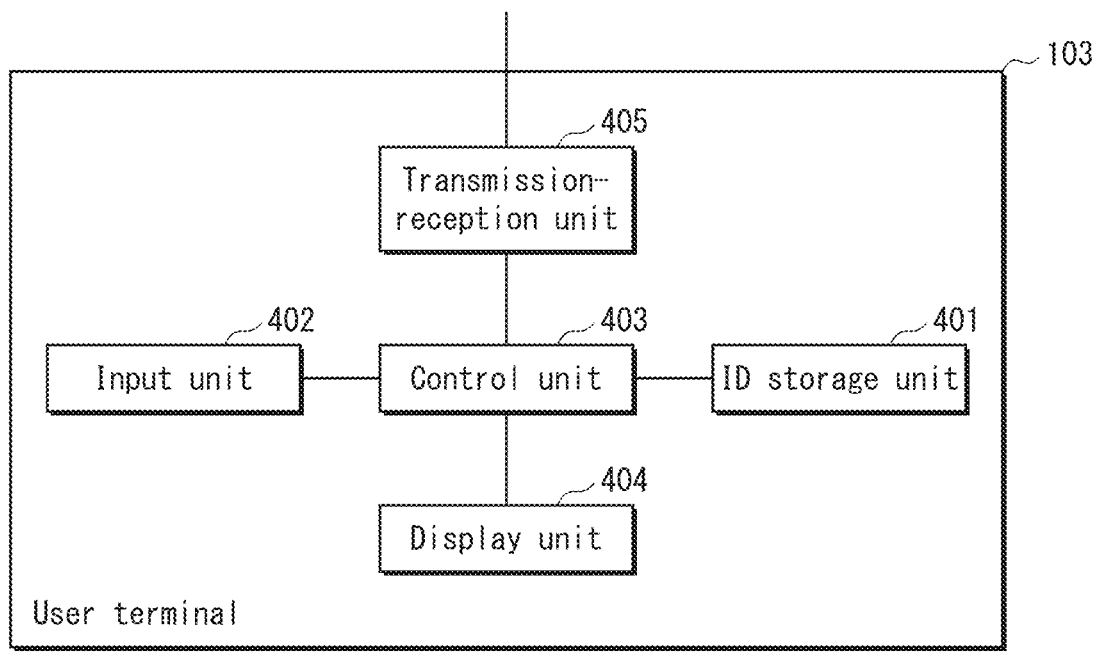
FIG. 11 is a block diagram illustrating configuration of a user terminal 103.

The user terminal 103 is for example a portable information terminal. As illustrated in FIG. 11, the user terminal 103 is configured by an ID storage unit 401, an input unit 402, a control unit 403, a display unit 404, and a transmission-reception unit 405. The user terminal 103 includes a processor, a memory, and an NIC, and implements functions of the control unit 403 through execution by the processor of a program stored in the memory. The user terminal 103 uses the NIC to perform transmission and reception of information via the Internet 110.

(1) ID Storage Unit 401

The ID storage unit 401 is a memory region for storing an ID that identifies the user of the user terminal 103.

(2) Input Unit 402

When the input unit 402 receives a request for a notification, the input unit 402 notifies the control unit 403 that the request has been received. Also, when the input unit 402 receives an item name for an item which is a target of the request, the input unit 402 outputs the item name to the control unit 403.

(3) Control Unit 403

When the control unit 403 is notified that a request for a notification has been received, and receives an item name from the input unit 402, the control unit 403 acquires the user ID from the ID storage unit 401.

The control unit 403 generates a request including the user ID acquired from the ID storage unit 401 and the item name received from the input unit 402. The control unit 403 transmits the request to the server 101, via the transmission-reception unit 405.

When the control unit 403 receives a notification from the server 101, via the transmission-reception unit 405, the control unit 403 displays the notification using the display unit 404.

(4) Display Unit 404

The display unit 404 includes a liquid crystal display (LCD) and displays an image, text, or the like.

The display unit 404 displays a notification which is received from the control unit 403.

The following explains examples of notifications displayed by the display unit 404.

Figure 12:
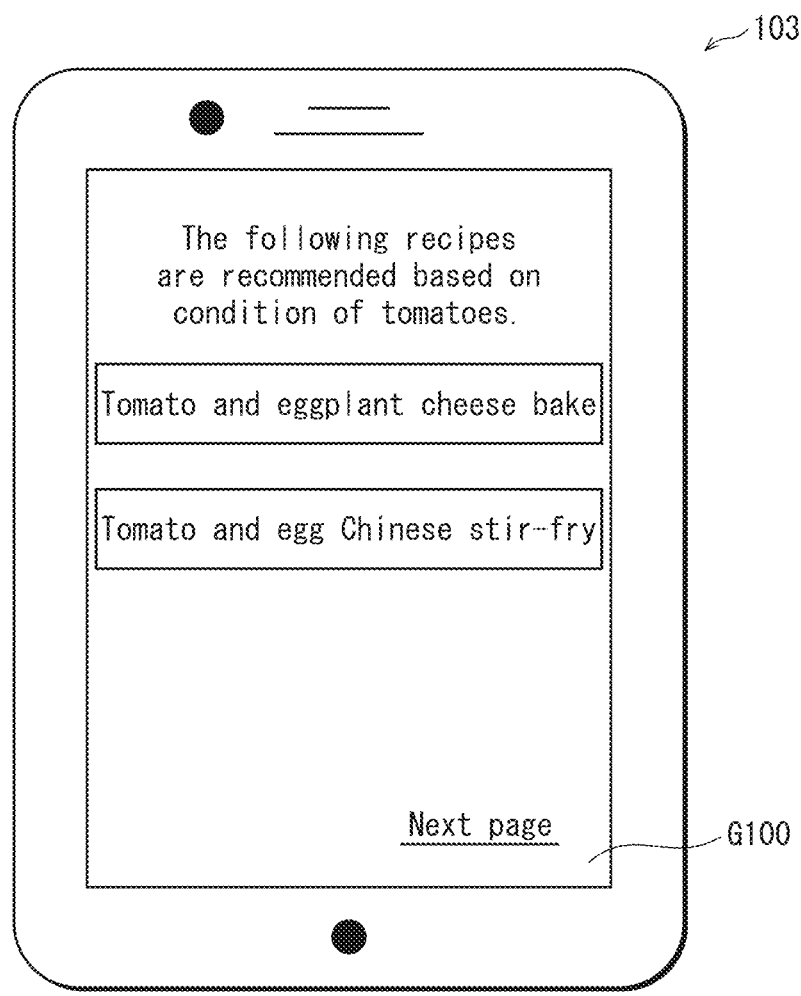
FIG. 12 illustrates one example of a notification provided on a display screen when deterioration level of an item is between level 1 and level 2.

FIG. 12 illustrates an example of a notification displayed on a screen when the server 101 determines that deterioration level of tomatoes owned by a user is between level 1 and level 2. In such a situation the server 101 uses, as the notification, one or more sets of recipe information that each correspond to a deterioration level between level 1 and level 2. The server 101 acquires the recipe information from the recipe information table T300 and transmits the recipe information as the notification. The display unit 404 of the user terminal 103 displays a recipe name for each recipe indicated by the one or more sets of recipe information (refer to screen G100 in FIG. 12).

Figure 13:
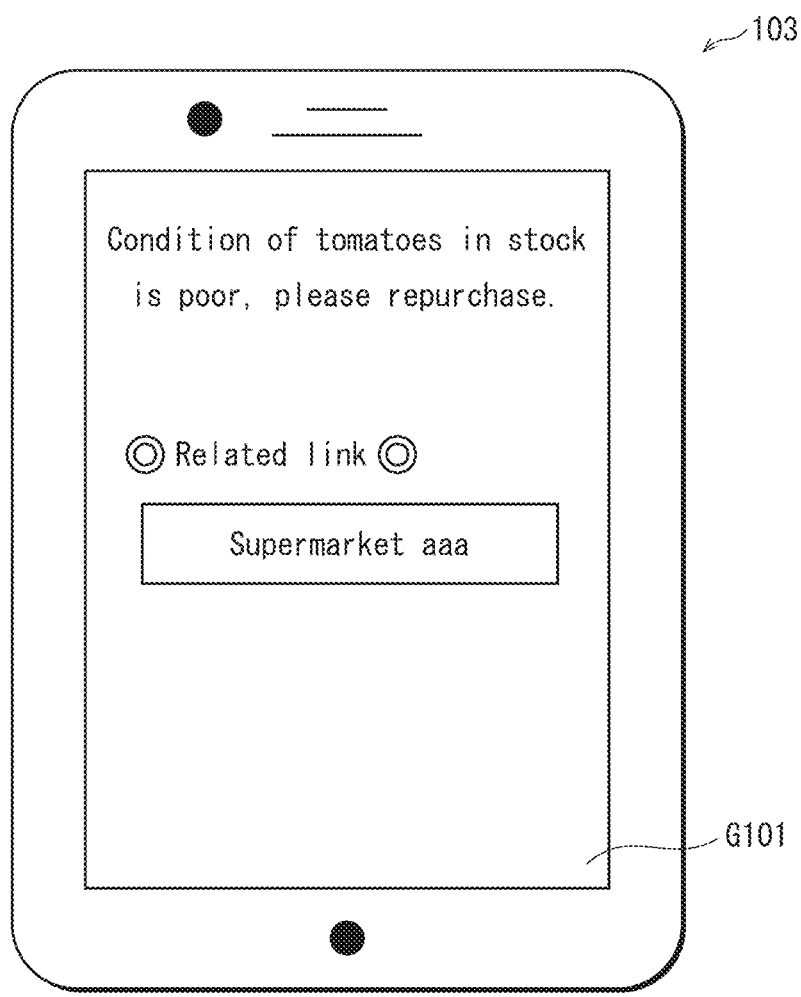
FIG. 13 illustrates one example of a notification provided on a display screen when deterioration level of an item exceeds level 3 and the item is sold in a store used by a user.

FIG. 13 illustrates an example of a notification displayed on a screen when the server 101 determines that deterioration level of tomatoes owned by a user exceeds level 3, and when a store used by the user sells tomatoes. In such a situation the server 101 uses, as the notification, one or more sets of vending information relating to tomatoes. The server 101 acquires the vending information from the vending information table T200, and transmits the vending information as the notification. The display unit 404 of the user terminal 103 displays a store name of each store which is indicated to sell tomatoes by the one or more sets of vending information (refer to screen G101 in FIG. 13).

Figure 14:
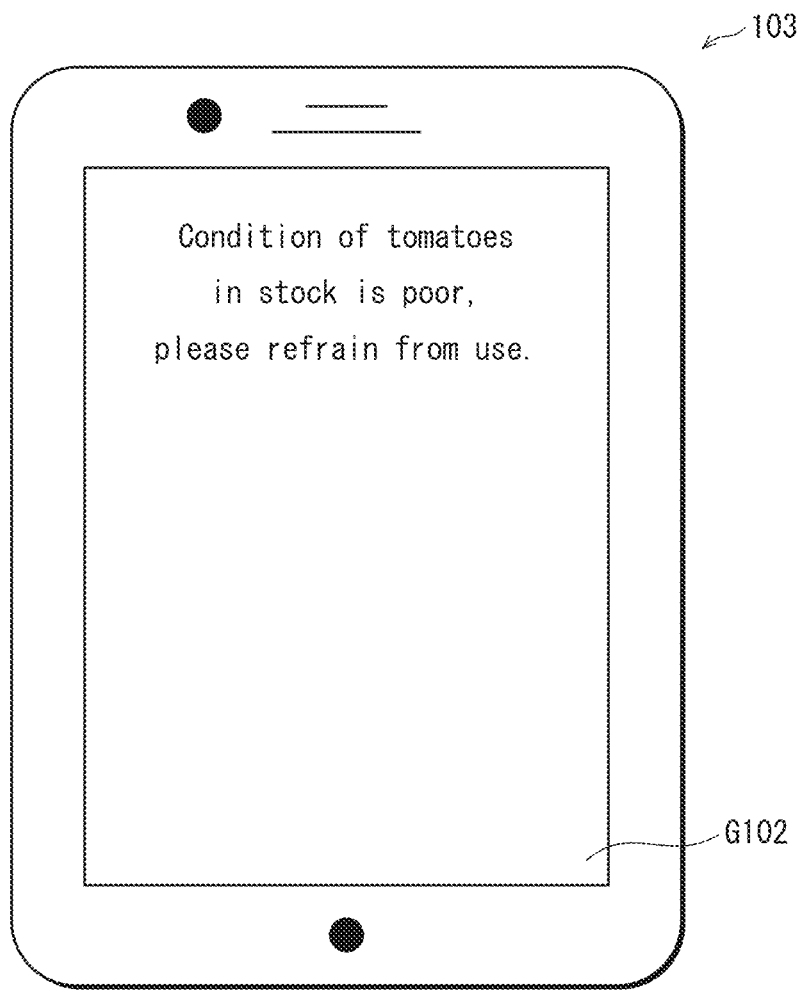
FIG. 14 illustrates one example of a notification provided on a display screen when deterioration level of an item exceeds level 3 and the item is not sold in a store used by a user.

FIG. 14 illustrates an example of a notification displayed on a screen when the server 101 determines that deterioration level of tomatoes owned by a user exceeds level 3, and when tomatoes are not sold by any store used by the user. In such a situation the server 101 generates, as the notification, a message recommending that the tomatoes should not be used in cooking, and transmits the message as the notification. The display unit 404 of the user terminal 103 displays the message (refer to screen G102 in FIG. 14).

(5) Transmission-Reception Unit 405

The transmission-reception unit 405 includes the aforementioned NIC, and performs transmission and reception of information between the user terminal 103 and the server 101, via the Internet 110.

More specifically, the transmission-reception unit 405 receives a request from the control unit 403 and transmits the request to the server 101, via the Internet 110. Also, when the transmission-reception unit 405 receives a notification from the server 101, via the Internet 110, the transmission-reception unit 405 outputs the notification to the control unit 403.

1.5 Operation (1) Overview

Figure 15:
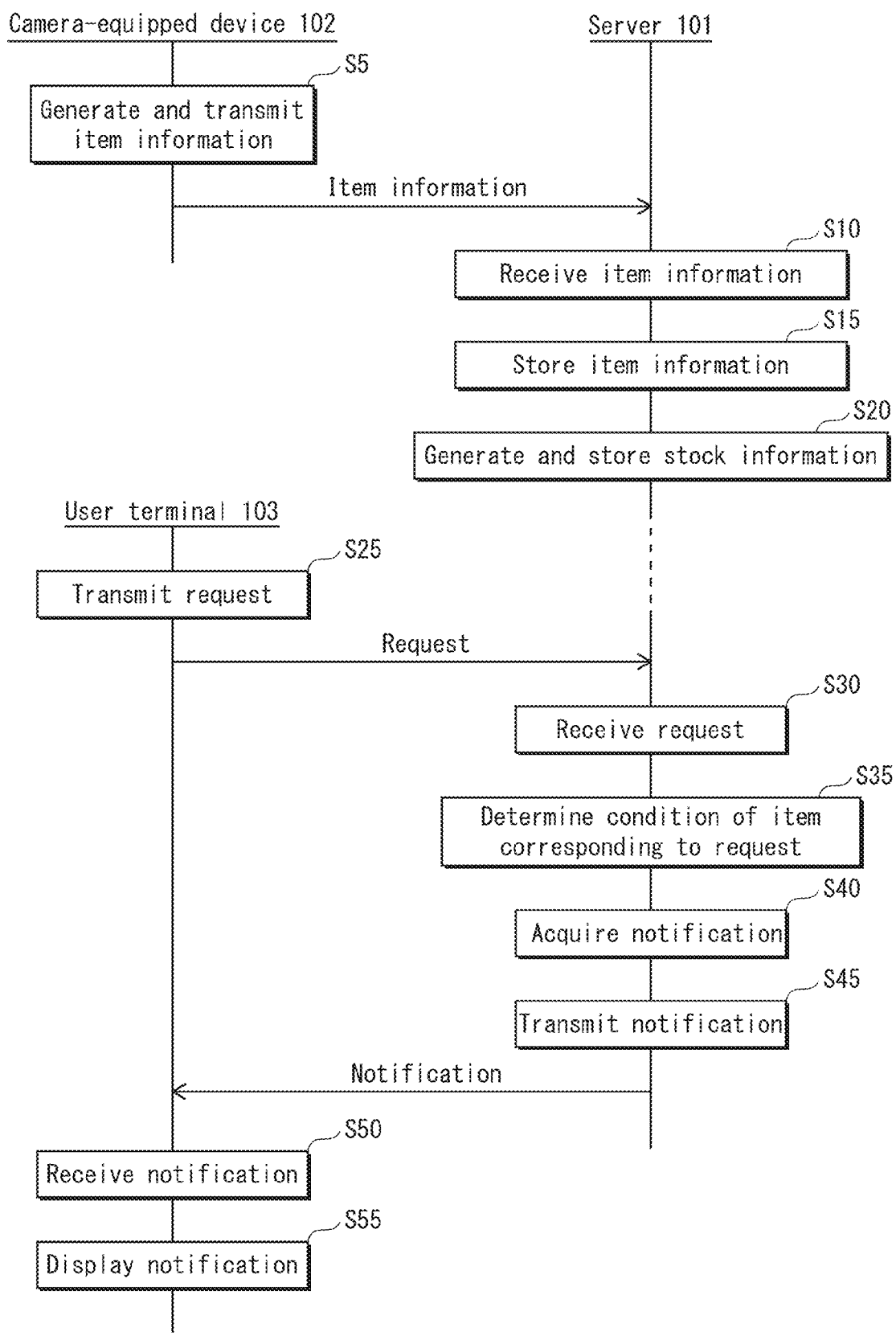
FIG. 15 is a flow diagram illustrating an overview of operation of the information-providing system 100.

The following provides an overview of operation of the information-providing system 100 with reference to the flow diagram illustrated in FIG. 15.

The camera-equipped device 102 generates a set of item information for an item captured by the camera 301, and transmits the item information to the server 101 via the Internet 110 (Step S5).

When the server 101 receives the item information transmitted from the camera-equipped device 102 via the Internet 110 (Step S10), the server 101 stores the item information in the item information table T500 (Step S15).

The server 101 generates a set of stock information using the received item information and a set of purchasing information for the item to which the received item information relates, and the server 101 stores the generated stock information in the stock information table T600 (Step S20). When a set of stock information for the item to which the received item information relates is already present in the stock information table T600, the server 101 updates the stock information using the received item information.

In response to an instruction from the user, the user terminal 103 transmits a request to the server 101 via the Internet 110 (Step S25).

The server 101 receives the request transmitted from the user terminal 103 via the Internet 110 (Step S30). The server 101 determines condition (deterioration level) of an item indicated by an item name included in the request received thereby (Step S35). The server 101 acquires a notification in accordance with condition of the item (Step S40), and transmits the notification to the user terminal 103 via the Internet 110 (Step S45).

When the user terminal 103 receives the notification transmitted from the server 101 via the Internet 110 (Step S50), the user terminal 103 displays the notification (Step S55).

(2) Processing Upon Reception of Item Information

Figure 16:
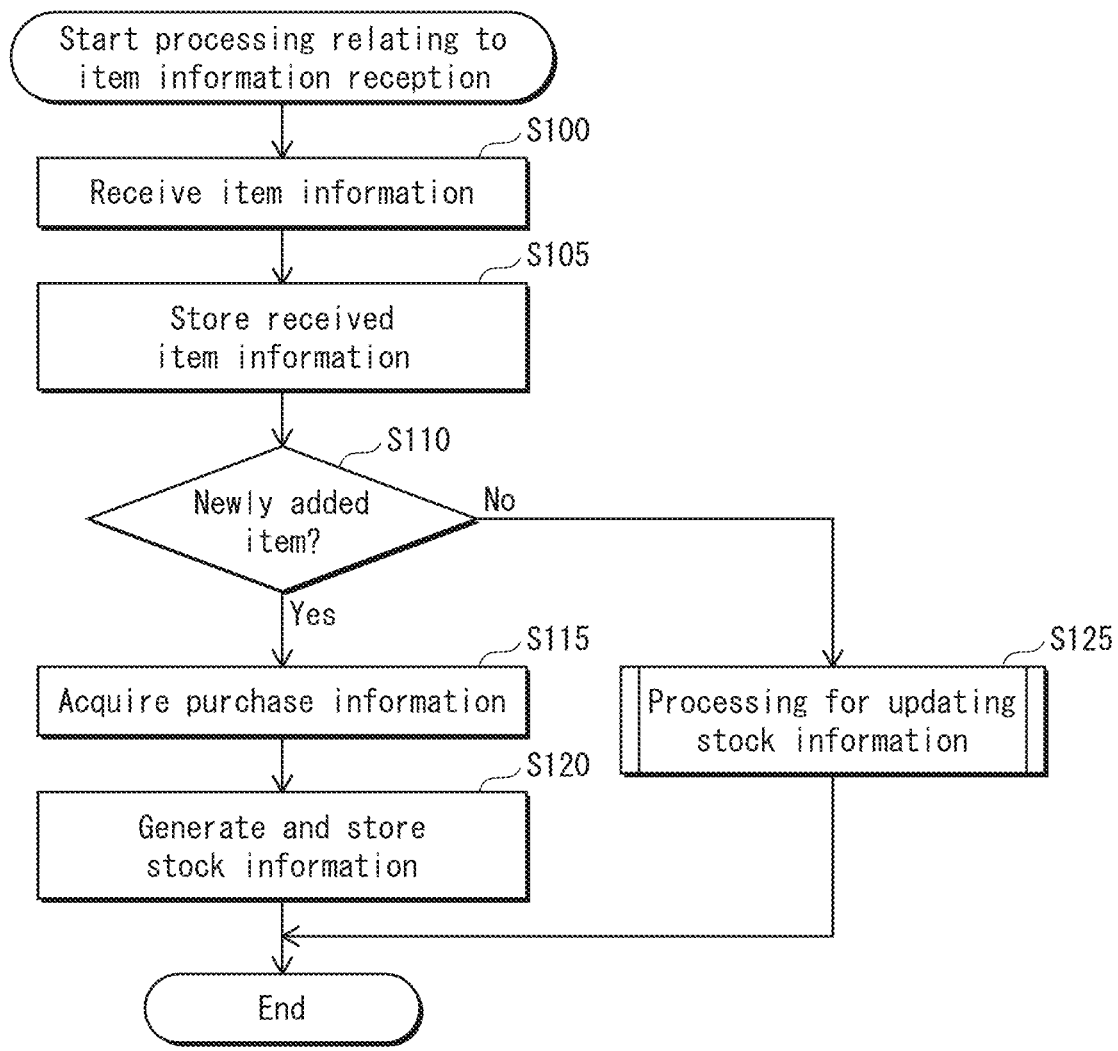
FIG. 16 is a flow diagram illustrating operation of the server 101 when item information is received.

The following explains, with reference to the flow diagram illustrated in FIG. 16, processing performed when the server 101 receives item information transmitted from the camera-equipped device 102.

The transmission-reception unit 211 of the server 101 receives a set of item information transmitted from the camera-equipped device 102, via the Internet 110 (Step S100). Note that Step S100 indicates details of processing in Step S10 illustrated in FIG. 15.

The item information acquisition unit 207 of the server 101 stores the item information received thereby in the item information table T500 (Step S105). Note that Step S105 indicates details of processing in Step S15 illustrated in FIG. 15.

The stock information generation unit 208 of the server 101 judges whether or not an item to which the received item information relates is a newly added item (Step S110). More specifically, the stock information generation unit 208 judges whether or not the add button T507 included in the received item information indicates "Yes". When the add button T507 indicates "Yes", the stock information generation unit 208 judges that the item to which the item information relates is a newly added item. When the add button T507 does not indicate "Yes", the stock information generation unit 208 judges that the item to which the item information relates is not a newly added item.

When the stock information generation unit 208 judges that the item to which the item information relates is a newly added item (Step S110: Yes), the stock information generation unit 208 acquires a set of purchase information from the purchase information table T400 which includes a user ID and an item name that respectively match a user ID and an item name included in the item information (Step S115).

The stock information generation unit 208 uses the acquired purchase information and the received item information in order to generate a set of stock information, and stores the stock information in the stock information table T600 (Step S120).

When the stock information generation unit 208 judges that the item to which the item information relates is not a newly added item (Step S110: No), the stock information generation unit 208 performs update processing on a set of stock information which includes a user ID and an item name that respectively match a user ID and an item name included in the item information (Step S125).

Note that Steps S110 to S125 indicate details of processing in Step S20 illustrated in FIG. 15.

(3) Processing for Updating Stock Information

Figure 17:
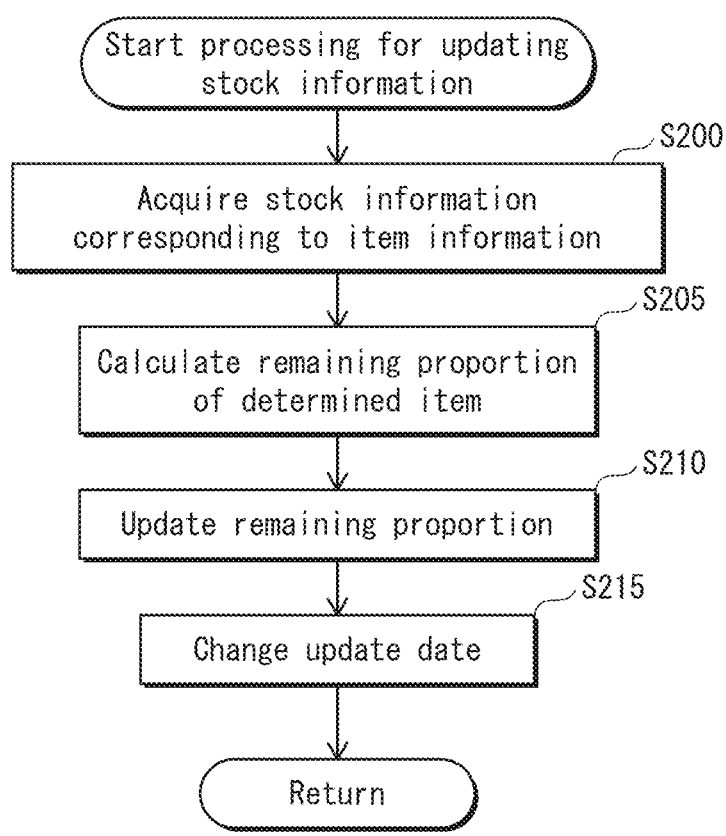
FIG. 17 is a flow diagram illustrating processing for updating stock information.

The following explains, with reference to the flow diagram illustrated in FIG. 17, details of operation during processing for updating stock information in Step S125 illustrated in FIG. 16.

The stock information generation unit 208 acquires a set of stock information from the stock information table T600 which includes a user ID and an item name that respectively match to a user ID and an item name included in a set of received item information (Step S200).

The stock information generation unit 208 calculates a remaining proportion of an item indicated by the item name included in the item information (Step S205). More specifically, the stock information generation unit 208 acquires a set of item information from the item information table T500 which relates to the same item as indicated in the received item information, and for which the add button T507 included therein indicates that the add button has been pressed. The stock information generation unit 208 calculates the remaining proportion based on a formula "amount included in received item information"/"amount included in item information acquired from item information table T500".

The stock information generation unit 208 updates the remaining proportion included in the stock information acquired from the stock information table T600 to match the remaining proportion calculated by the stock information generation unit 208 (Step S210). The stock information generation unit 208 also updates an update date included in the acquired stock information (Step S215).

(4) Processing for Notification Acquisition

Figure 18:
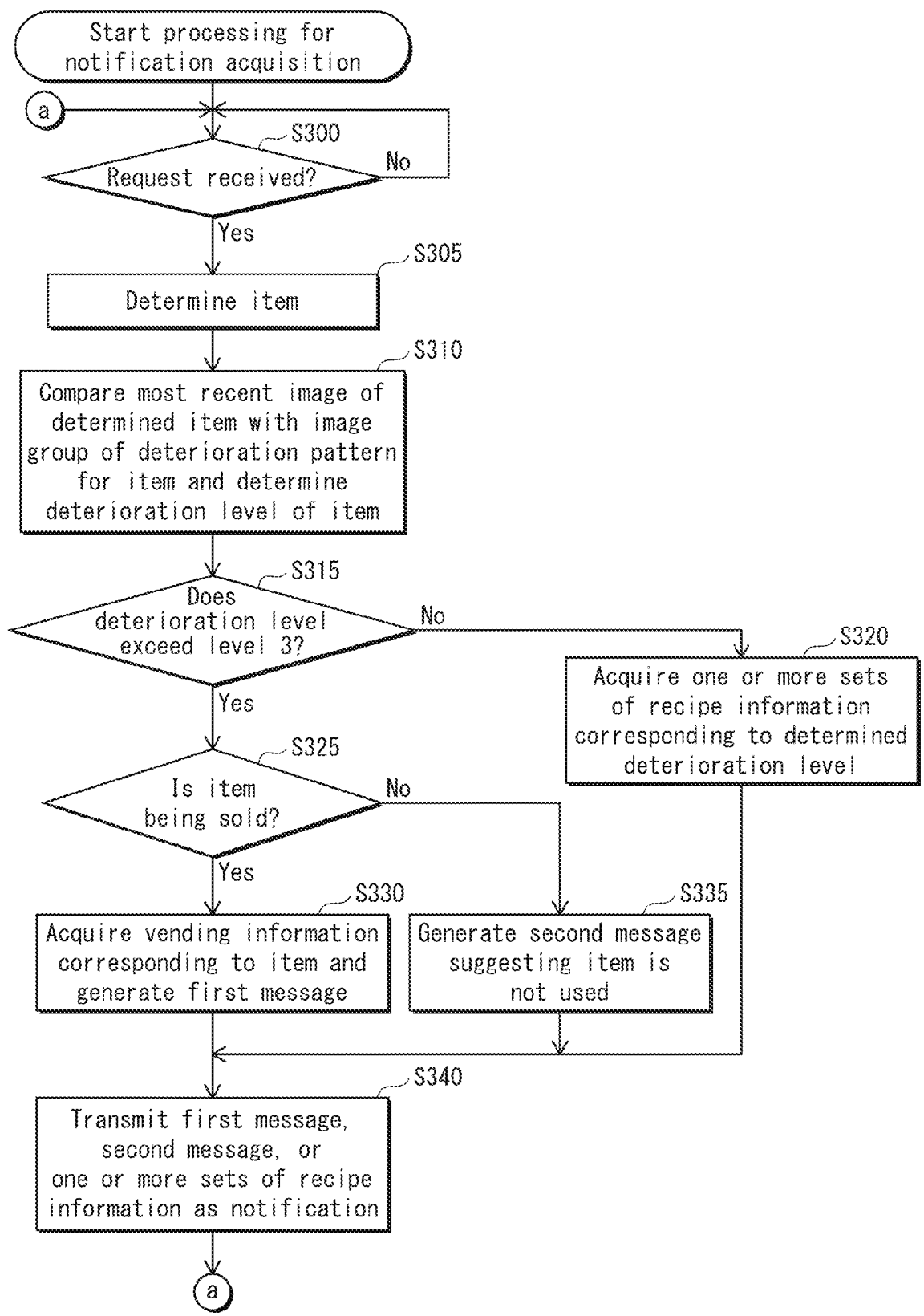
FIG. 18 is a flow diagram illustrating processing for notification acquisition in the information-providing system 100.

The following explains, with reference to the flow diagram illustrated in FIG. 18, processing for acquiring and transmitting a notification when the server 101 receives a request from the user terminal 103.

The transmission-reception unit 211 of the server 101 judges whether or not a request transmitted from the user terminal 103 has been received (Step S300).

When the transmission-reception unit 211 judges that a request has been received (Step S300: Yes), the notification acquisition unit 209 of the server 101 determines an item which is indicated by an item name included in the received request (Step S305). When the transmission-reception unit 211 judges that a request has not been received (Step S300: No), the notification acquisition unit 209 remains on standby for reception of a request.

The quality determination unit 210 of the server 101 determines a current condition (deterioration level) of the item determined in Step S305 using a most recent image of the item and a deterioration pattern group for the item (Step S310). More specifically, the quality determination unit 210 acquires a deterioration pattern group from the quality pattern storage unit 206 which has an item name that matches the item name included in the request. The quality determination unit 210 also acquires a set of item information from the item information table T500 of the stock information storage unit 205 which includes a user ID and an item name that respectively match a user ID and the item name included in the request. Note that when one or more sets of item information include the same user ID and the same item name, the quality determination unit 210 acquires a set of item information including a most recent image capture date among the one or more sets of item information. The quality determination unit 210 compares an image included in the acquired item information with the deterioration pattern group, and thus determines deterioration level of the item for which a notification is being requested. Note that when determining deterioration level, if the image capture date of the image included in the acquired item information is at least a predetermined number of days prior to reception of the request, the quality determination unit 210 adds a predetermined value to the determined deterioration level in order to set a current deterioration level of the item.

The notification acquisition unit 209 judges whether the deterioration level, determined for the item in Step S310, exceeds level 3 (Step S315).

When the notification acquisition unit 209 judges that the deterioration level of the item does not exceed level 3 (Step S315: No), the notification acquisition unit 209 acquires, in accordance with the deterioration level, one or more sets of recipe information from the recipe information table T300 which are each for a recipe that uses the item (Step S320).

When the notification acquisition unit 209 judges that the deterioration level of the item exceeds level 3 (Step S315: Yes), the notification acquisition unit 209 subsequently judges whether the item is currently being sold (Step S325). More specifically, the notification acquisition unit 209 uses the vending information table T200 and the user information table T100 in order to judge whether the item, indicated by the item name included in the request, is sold at a store used by the user, indicated by the user ID included in the request.

When the notification acquisition unit 209 judges that the item is currently being sold (Step S325: Yes), the notification acquisition unit 209 acquires a set of vending information corresponding to the item and generates a first message (Step S330). The first message is a message that suggests purchasing the item indicated by the item name at a store indicated by a store name included in the acquired vending information. The notification acquisition unit 209 stores in advance, linked to information indicating that deterioration level exceeds level 3, model text that can be used to complete the first message simply by insertion of the item name and the store name included in the acquired vending information.

When the notification acquisition unit 209 judges that the item is not currently being sold (Step S325: No), the notification acquisition unit 209 generates a second message that suggest that the item should not be used in cooking (Step S335). More specifically, the notification acquisition unit 209 stores in advance, linked to information indicating that deterioration level exceeds level 3, model text that can be used to complete the second message simply by insertion of the item name. Thus, the notification acquisition unit 209 can acquire a message to be transmitted simply by inserting an item name, indicated by a user, into stored model text.

The notification acquisition unit 209 subsequently transmits a notification acquired thereby to the user terminal 103 (Step S340). In terms of the notification in Step S340, when the notification acquisition unit 209 acquires one or more sets of recipe information in Step S320, the notification acquisition unit 209 uses the acquired recipe information as the notification, when the notification acquisition unit 209 generates the first message in Step S330, the notification acquisition unit 209 uses the first message as the notification, and when the notification acquisition unit 209 generates the second message in Step S335, the notification acquisition unit 209 uses the second message as the notification.

Note that processing in Step S300, and in particular processing when judging that a request has been received, corresponds to processing in Step S30 illustrated in FIG. 15. Steps S305 to S310 indicate details of processing in Step S35 illustrated in FIG. 15, and Steps S315 to S335 indicate details of processing in Step S40 illustrated in FIG. 15. Also, Step S340 indicates details of processing in Step S45 illustrated in FIG. 15.

2. Second Embodiment 2.1 Information-Providing System 1000

An information-providing system 1000 is a system for providing, to a user, a notification relating to an item of clothing which is an item owned by the user, in accordance with condition of the item of clothing.

Figure 19:
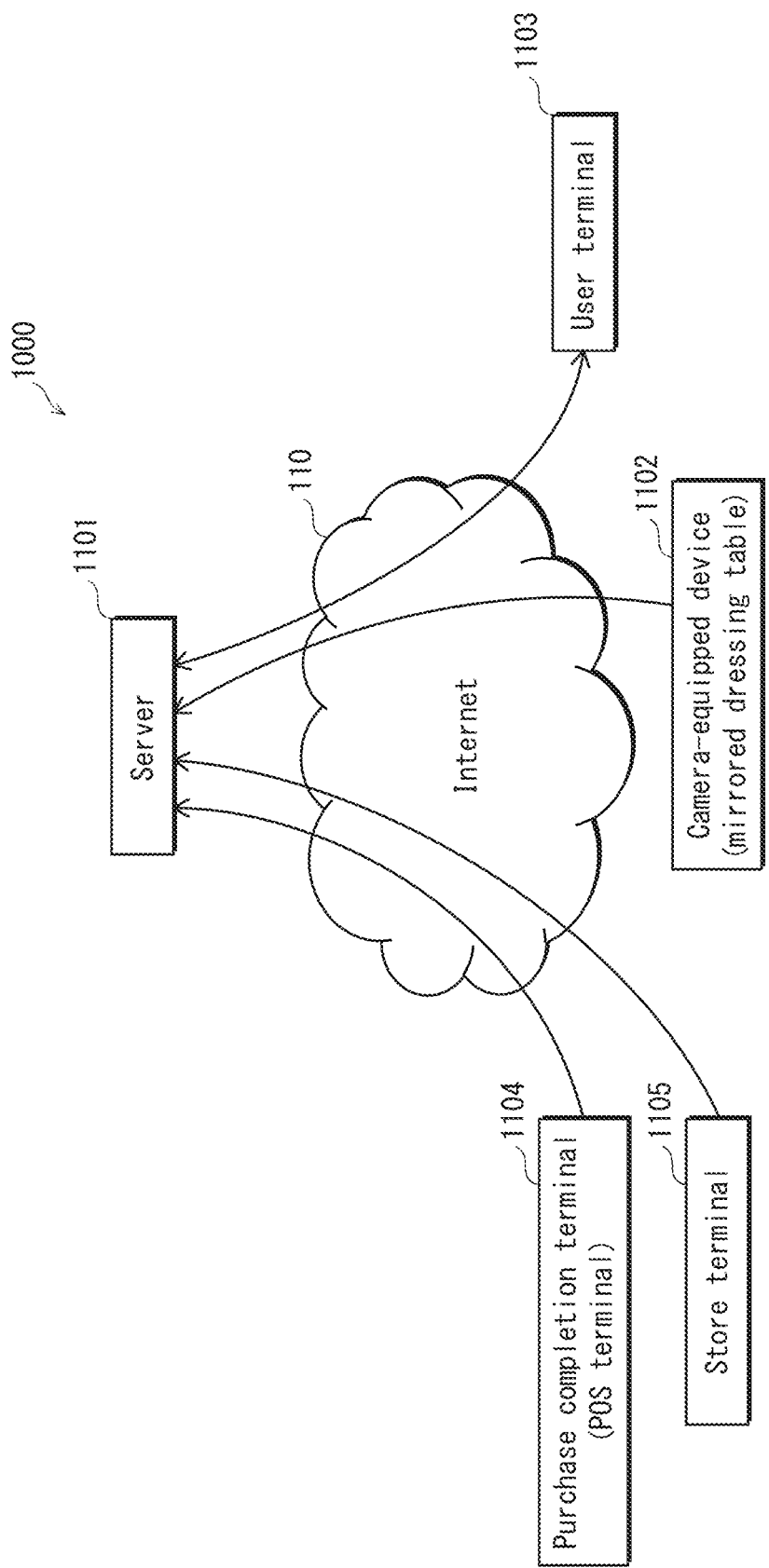
FIG. 19 illustrates an overview of an information-providing system 1000.

As illustrated in FIG. 19, the information-providing system 1000 includes a server 1101, a camera-equipped device 1102, a user terminal 1103, a purchase completion terminal 1104, and a store terminal 1105.

The server 1101 manages each item of clothing owned by a user. When the server 1101 receives a request from the user terminal 1103, via the Internet 110, for a notification relating to an item of clothing owned by a user, the server 1101 provides a notification to the user of the user terminal 1103 in accordance with change in condition (for example, change in quality) of the item of clothing, which is managed by the server 1101.

The camera-equipped device 1102 is for example a mirrored dressing table having a camera connected thereto. The camera-equipped device 1102 captures an image of an item of clothing using the camera when the user checks their appearance in the mirrored dressing table. The camera-equipped device 1102 transmits the image to the server 1101, via the Internet 110, in order that the server 1101 can manage the item of clothing.

The user terminal 1103 transmits a request to the server 1101, via the Internet 110, requesting a notification for an item of clothing. When the user terminal 1103 receives a notification from the server 1101 for an item of clothing, the user terminal 1103 presents the notification to the user by displaying contents thereof.

The purchase completion terminal 1104 is for example a POS terminal located at a clothing store. The purchase completion terminal 1104 transmits information for each item of clothing purchased by a user (herein referred to as clothing purchase information) to the server 1101, via the Internet 110.

The store terminal 1105 is a terminal for managing information relating to each item of clothing sold by a clothing store (herein referred to as clothing vending information). The store terminal 1105 transmits clothing vending information to the server 1101, via the Internet 110, in order that the server 1101 can use the clothing vending information when acquiring a notification, for example through generation of the notification.

2.2 Server 1101

The following explains configuration of the server 1101.

Figure 20:
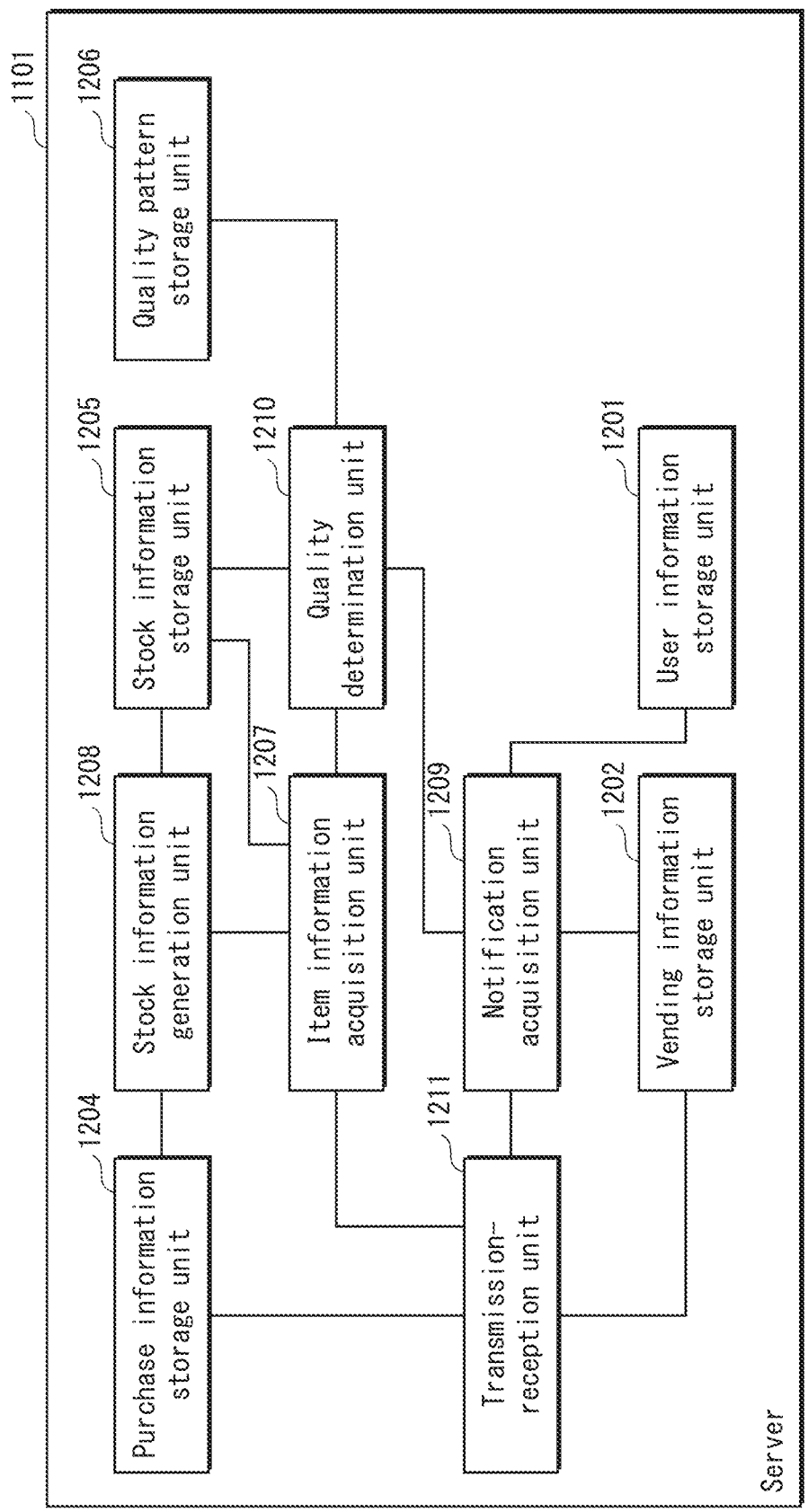
FIG. 20 is a block diagram illustrating configuration of a server 1101.

As illustrated in FIG. 20, the server 1101 is configured by a user information storage unit 1201, a vending information storage unit 1202, a purchase information storage unit 1204, a stock information storage unit 1205, a quality pattern storage unit 1206, an item information acquisition unit 1207, a stock information generation unit 1208, a notification acquisition unit 1209, a quality determination unit 1210, and a transmission-reception unit 1211.

The server 1101 includes a processor, a memory, and an NIC, and implements functions of the item information acquisition unit 1207, the stock information generation unit 1208, the notification acquisition unit 1209, and the quality determination unit 1210 through execution by the processor of a program stored in the memory. The server 1101 uses the NIC to perform transmission and reception of information via the Internet 110.

(1) User Information Storage Unit 1201

The user information storage unit 1201 is the same as the user information storage unit 201 described in the first embodiment. Therefore, explanation of the user information storage unit 1201 is omitted. Note that when necessary, the following explanation refers to the user information table T100 illustrated in FIG. 3.

(2) Vending Information Storage Unit 1202

The vending information storage unit 1202 is a memory region storing, for each store, clothing vending information relating to each item of clothing sold by the store. The vending information storage unit 1202 includes a vending information table T1200.

As illustrated in FIG. 21, the vending information table T1200 stores one or more sets of clothing vending information, each including a store name T1201, an item name T1202, a store display date T1203, display information T1204, a stock number T1205, a provider T1206, a color T1207, a coordination color T1208, and a coordination item name T1209.

The store name T1201 indicates a name of a store.

The item name T1202 indicates a name of an item of clothing that is sold by the store.

The store display date T1203 indicates a date on which the item of clothing indicated by the corresponding item name is displayed in the store.

The display information T1204 indicates a location at which the item of clothing indicated by the corresponding item name is displayed.

The stock number T1205 indicates a number of the item of clothing indicated by the corresponding item name which the store has in stock.

The provider T1206 indicates a provider from which the item of clothing indicated by the corresponding item name is obtained.

The color T1207 indicates a color of the item of clothing indicated by the corresponding item name.

The coordination color T1208 indicates a color that is recommended for coordination with the color indicated by the color T1207.

The coordination item name T1209 indicates an item name of an item of clothing that is recommended for coordination with the item of clothing indicated by the item name T1202.

(3) Purchase Information Storage Unit 1204

The purchase information storage unit 1204 is a memory region for storing, for each store, clothing purchase information relating to each item of clothing purchased by a user. The purchase information storage unit 1204 includes a purchase information table T1400.

As illustrated in FIG. 22, the purchase information table T1400 stores one or more sets of clothing purchase information, each including a store name T1401, a purchaser T1402, an item name T1403, a purchase date T1404, and a purchase number T1405.

The store name T1401 indicates a name of a store.

The purchaser T1402 indicates a user who has made a purchase. Note that in the present embodiment the purchaser is indicated by a user ID.

The item name T1403 indicates a name of an item of clothing purchased by the user.

The purchase date T1404 indicates a date on which the user purchased the item of clothing.

The purchase number T1405 indicates a number of the item of clothing that the user has purchased.

(4) Stock Information Storage Unit 1205

The stock information storage unit 1205 is a memory region for storing information relating to each item of clothing owned by a user. The stock information storage unit 1205 includes an item information table T1500 and a stock information table T1600.

(4-1) Item Information Table T1500

The item information table T1500 stores information that indicates condition of each item of clothing owned by a user (herein referred to as clothing item information). As illustrated in FIG. 23, the item information table T1500 stores one or more sets of clothing item information each including a user ID T1501, an item name T1502, an image T1503, an image capture date T1504, and an add button T1505.

The user ID T1501 is an identification code that identifies a user.

The item name T1502 indicates a name of an item of clothing owned by the user.

The image T1503 is an image of the item of clothing owned by the user which corresponds to the item name.

The image capture date T1504 indicates a date on which the image was captured.

The add button T1505 indicates whether or not an add button of the camera-equipped device 1102 has been pressed. The add button of the camera-equipped device 1102 is explained further below.

(4-2) Stock Information Table T1600

The stock information table T1600 stores information, such as purchase date, for each item of clothing owned by a user (herein referred to as clothing stock information). As illustrated in FIG. 24, the stock information table T1600 stores one or more sets of clothing stock information, each including a user ID T1601, an item name T1602, a purchase date T1603, and a purchase location T1604.

The user ID T1601 is an identification code that identifies a user.

The item name T1602 indicates a name of an item of clothing owned by the user.

The purchase date T1603 indicates a date on which the user purchased the item of clothing indicated by the item name T1602.

The purchase location T1604 indicates a store at which the user purchased the item of clothing indicated by the item name T1602.

(5) Quality Pattern Storage Unit 1206

The quality pattern storage unit 1206 is a memory region for storing reference images which are used as targets for comparison with an image included in clothing item information in order to determine condition (deterioration level) of an item of clothing owned by a user. The quality pattern storage unit 1206 includes a quality pattern table T1700.

Figure 25:
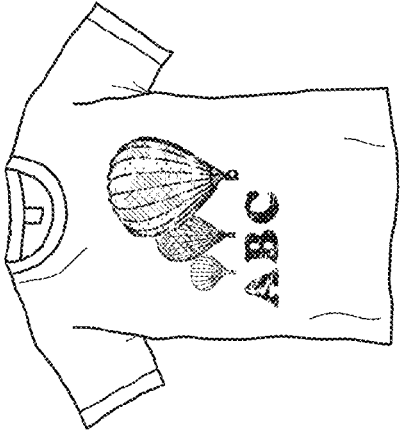
FIG. 25 illustrates one example of data structure of a quality pattern table T1700.

As illustrated in FIG. 25, the quality pattern table T1700 stores one or more sets of information, each including an item name T1701 and a deterioration level T1702.

The item name T1701 indicates a name of an item of clothing owned by a user.

As illustrated in FIG. 25, the deterioration level T1702 is categorized into levels 1 and 2. The deterioration level T1702 stores images of the item of clothing corresponding to the respective deterioration levels. A higher value deterioration level indicates a higher degree of deterioration of the item of clothing. When deterioration level exceeds level 2, color of the item of clothing may for example have significantly faded. Note that in the same way as in the first embodiment, in the second embodiment an image group composed of respective images corresponding to the deterioration levels is referred to as a deterioration pattern group.

(6) Item Information Acquisition Unit 1207

The item information acquisition unit 1207 acquires clothing item information from the camera-equipped device 1102, via the Internet 110. When the item information acquisition unit 1207 acquires the clothing item information, the item information acquisition unit 1207 stores the clothing item information in the item information table T1500 of the stock information storage unit 1205.

The item information acquisition unit 1207 also outputs the clothing item information acquired thereby to the stock information generation unit 1208.

(7) Stock Information Generation Unit 1208

The stock information generation unit 1208 generates a set of clothing stock information using a set of clothing item information output from the item information acquisition unit 1207 for an item of clothing owned by a user and a set of clothing purchase information relating to the user stored in the purchase information storage unit 1204.

More specifically, the stock information generation unit 1208 has functions explained below.

When the add button T1505 included in the set of clothing item information received from the item information acquisition unit 1207 indicates "Yes", the stock information generation unit 1208 acquires a set of clothing purchase information from the purchase information storage unit 1204 which includes a user ID and an item name that respectively match a user ID and an item name included in the received clothing item information. The stock information generation unit 1208 uses the clothing purchase information, acquired from the purchase information storage unit 1204, to generate a set of clothing stock information and stores the clothing stock information in the stock information table T1600 of the stock information storage unit 1205.

When the add button T1505 included in the set of clothing item information received from the item information acquisition unit 1207 indicates "No", the stock information generation unit 1208 does not generate clothing stock information.

(8) Notification Acquisition Unit 1209

The notification acquisition unit 1209 acquires a notification in accordance with deterioration level of an item of clothing owned by a user. The notification acquisition unit 1209 provides the notification to the user via the Internet 110.

More specifically, the notification acquisition unit 1209 has functions explained below.

The notification acquisition unit 1209 acquires a request from the user terminal 1103, via the Internet 110, requesting a notification relating to an item of clothing owned by the user. In the same way as described in the first embodiment, the request includes a user ID and an item name indicating the item of clothing to which the request relates.

The notification acquisition unit 1209 outputs the request, acquired from the user terminal 1103, to the quality determination unit 1210.

The notification acquisition unit 1209 acquires a deterioration level from the quality determination unit 1210 for the item of clothing owned by the user, which corresponds to the item name included in the request.

Based on the deterioration level, the notification acquisition unit 1209 acquires a notification to be provided to the user, which relates to the item of clothing corresponding to the item name included in the request. For example, the notification acquisition unit 1209 acquires the notification, in accordance with the deterioration level, by generating a notification relating to the item of clothing, or by acquiring, as the notification, information from the vending information storage unit 1202 indicating a store that sells the item of clothing.

The notification acquisition unit 1209 transmits the acquired notification, via the Internet 110, to the user terminal 1103 which transmitted the request.

(9) Quality Determination Unit 1210

The quality determination unit 1210 determines condition (deterioration level) of an item of clothing owned by a user.

More specifically, the quality determination unit 1210 has functions explained below.

When the quality determination unit 1210 receives a request from the notification acquisition unit 1209, the quality determination unit 1210 acquires, from the quality pattern storage unit 1206, a deterioration pattern group having an item name that matches an item name included in the received request.

The quality determination unit 1210 also acquires, from the item information table T1500 of the stock information storage unit 1205, a set of clothing item information which includes a user ID and an item name that respectively match a user ID and the item name included in the received request. Note that when one or more sets of clothing item information in the item information table T1500 include the same user ID and the same item name, the quality determination unit 1210 acquires a set of clothing item information that includes a most recent image capture date among the one or more sets of clothing item information.

The quality determination unit 1210 compares an image included in the acquired clothing item information with the acquired deterioration pattern group in order to determine deterioration level of an item of clothing for which a notification is being requested. The quality determination unit 1210 for example determines deterioration level of the item of clothing by judging which among items of clothing in images for deterioration levels 1 and 2 is most similar in terms of color to the item of clothing in the image included in the acquired clothing item information. The quality determination unit 1210 may for example alternatively judge whether color of the item of clothing in the image included in the acquired clothing item information is similar to an intermediate color between colors corresponding to deterioration levels 1 and 2. The quality determination unit 1210 may for example alternatively judge whether color of the item of clothing in the image included in the acquired clothing item information is more faded than color corresponding to deterioration level 2.

Furthermore, when determining deterioration level, if image capture date of the image included in the acquired clothing item information is at least a predetermined number of days (for example, three days) prior to reception of the request, the quality determination unit 1210 sets a current deterioration level of the item of clothing by adding a predetermined value to the deterioration level which is determined. The quality determination unit 1210 can for example acquire the current deterioration level using the same calculation method as explained in the first embodiment. Note that if the image capture date of the image included in the acquired clothing item information is within the predetermined number of days of reception of the request, the quality determination unit 1210 uses the deterioration level determined through the aforementioned comparison as the current deterioration level of the item of clothing.

The quality determination unit 1210 outputs, to the notification acquisition unit 1209, the current deterioration level of the item of clothing, which is acquired based on comparison with the deterioration pattern group.

(10) Transmission-Reception Unit 1211

The transmission-reception unit 1211 includes the NIC, and performs transmission and reception of information between the server 1101 and the camera-equipped device 1102, the user terminal 1103, the purchase completion terminal 1104, and the store terminal 1105, via the Internet 110.

More specifically, the transmission-reception unit 1211 has functions explained below.

When the transmission-reception unit 1211 receives clothing item information from the camera-equipped device 1102, via the Internet 110, the transmission-reception unit 1211 outputs the clothing item information to the item information acquisition unit 1207.

When the transmission-reception unit 1211 receives a request from the user terminal 1103, via the Internet 110, the transmission-reception unit 1211 outputs the request to the notification acquisition unit 1209.

When the transmission-reception unit 1211 receives clothing purchase information from the purchase completion terminal 1104, via the Internet 110, the transmission-reception unit 1211 stores the clothing purchase information in the purchase information table T1400 of the purchase information storage unit 1204.

When the transmission-reception unit 1211 receives clothing vending information from the store terminal 1105, via the Internet 110, the transmission-reception unit 1211 stores the clothing vending information in the vending information table T1200 of the vending information storage unit 1202.

2.3 Camera-Equipped Device 1102

The following explains configuration of the camera-equipped device 1102.

The camera-equipped device 1102 is for example a mirrored dressing table provided with a camera-equipped terminal capable of transmission and reception of information via the Internet.

Figure 26:
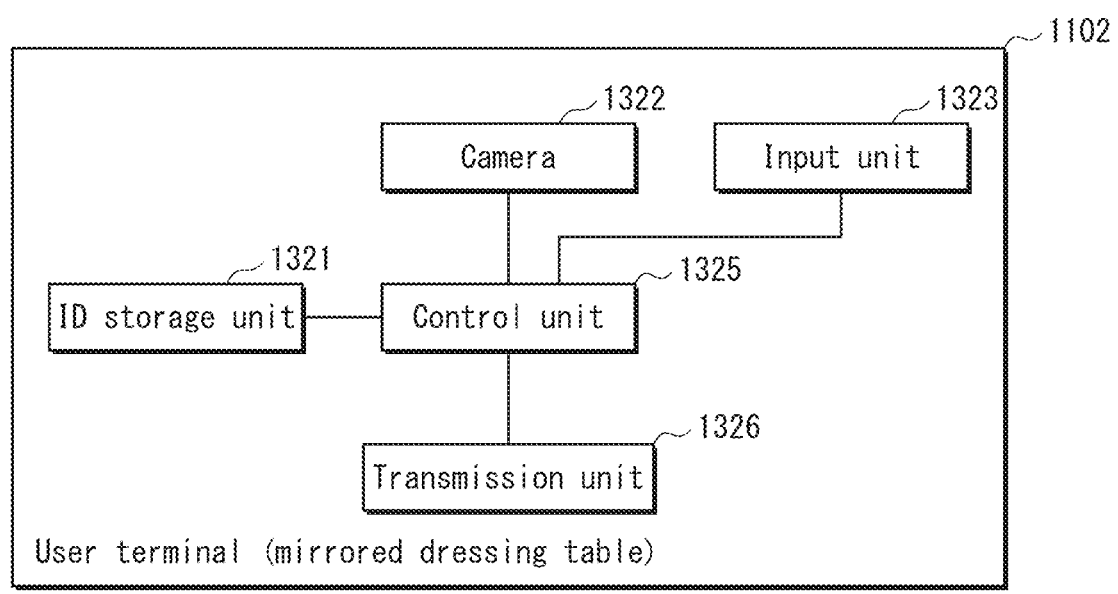
FIG. 26 is a block diagram illustrating configuration of a camera-equipped device 1102.

As illustrated in FIG. 26, the camera-equipped device 1102 is configured by an ID storage unit 1321, a camera 1322, an input unit 1323, a control unit 1325, and a transmission unit 1326. The camera-equipped device 1102 includes a processor, a memory, and an NIC, and implements functions of the control unit 1325 through execution by the processor of a program stored in the memory. The camera-equipped device 1102 uses the NIC to transmit and receive information via the Internet 110.

(1) ID Storage Unit 1321

The ID storage unit 1321 is a memory region for storing an ID that identifies a user of the camera-equipped device 1102.

(2) Camera 1322

The camera 1322 has an image capture function of capturing an image of an object.

More specifically, the camera 1322 captures an image of an item of clothing that the user is wearing when the user checks their appearance while standing in front of the mirrored dressing table.

(3) Input Unit 1323

The input unit 1323 has a text input function and includes the add button described further above.

The input unit 1323 receives input of an item name for an item of clothing that is a target of image capture by the camera 1322, and outputs the item name received thereby to the control unit 1325.

When the add button is pressed by the user, the input unit 1323 notifies the control unit 1325 that the add button has been pressed.

(4) Control Unit 1325

The control unit 1325 has a function of controlling each function of the camera-equipped device 1102 and also has a function of keeping track of the date.

More specifically, the control unit 1325 has functions explained below.

When the control unit 1325 receives an image captured by the camera 1322 and receives an item name from the input unit 1323, the control unit 1325 acquires the user ID from the ID storage unit 1321 and also acquires the current date.

The control unit 1325 generates a set of clothing item information including the user ID, the current date, the item name, and the image acquired thereby, in accordance with whether or not the add button has been pressed. The control unit 1325 transmits the clothing item information generated thereby to the server 1101, via the transmission unit 1326.

(5) Transmission Unit 1326

The transmission unit 1326 includes the aforementioned NIC, and performs transmission and reception of information between the camera-equipped device 1102 and the server 1101, via the Internet 110.

More specifically, the transmission unit 1326 receives clothing item information from the control unit 1325 and transmits the clothing item information to the server 1101, via the Internet 110.

2.4 User Terminal 1103

When the user terminal 1103 receives an instruction from the user requesting a notification relating to an item of clothing, the user terminal 1103 transmits a request to the server 1101 requesting a notification relating to the item of clothing. When the user terminal 1103 receives a notification from the server 1101 relating to an item of clothing, the user terminal 1103 displays the notification.

The user terminal 1103 in the present embodiment differs from the user terminal 103 in the first embodiment in terms that information transmitted and received in the present embodiment (i.e., the request and the notification) relates to an item of clothing, whereas information transmitted and received in the first embodiment relates to a cooking ingredient. In other words, the only difference is in terms of information content, and the user terminal 1103 in the present invention is configured by the same elements as the user terminal 103 in the first embodiment. Therefore, explanation of elements configuring the user terminal 1103 is omitted.

2.5 Operation (1) Overview

The information-providing system 1000 in the present embodiment differs from the information-providing system 100 in the first embodiment in terms that information transmitted and received between devices (i.e., the request and the notification), and stock information generated by the server 1101 in the present embodiment relate to an item of clothing, whereas in the first embodiment the aforementioned information relates to a cooking ingredient. Consequently, an overview of operation of the information-providing system 1000 in the present embodiment is the same as the overview of operation explained for the first embodiment using the flow diagram illustrated in FIG. 15. Therefore, explanation of an overview of operation is omitted for the information-providing system 1000.

(2) Processing Upon Reception of Clothing Item Information

Figure 27:
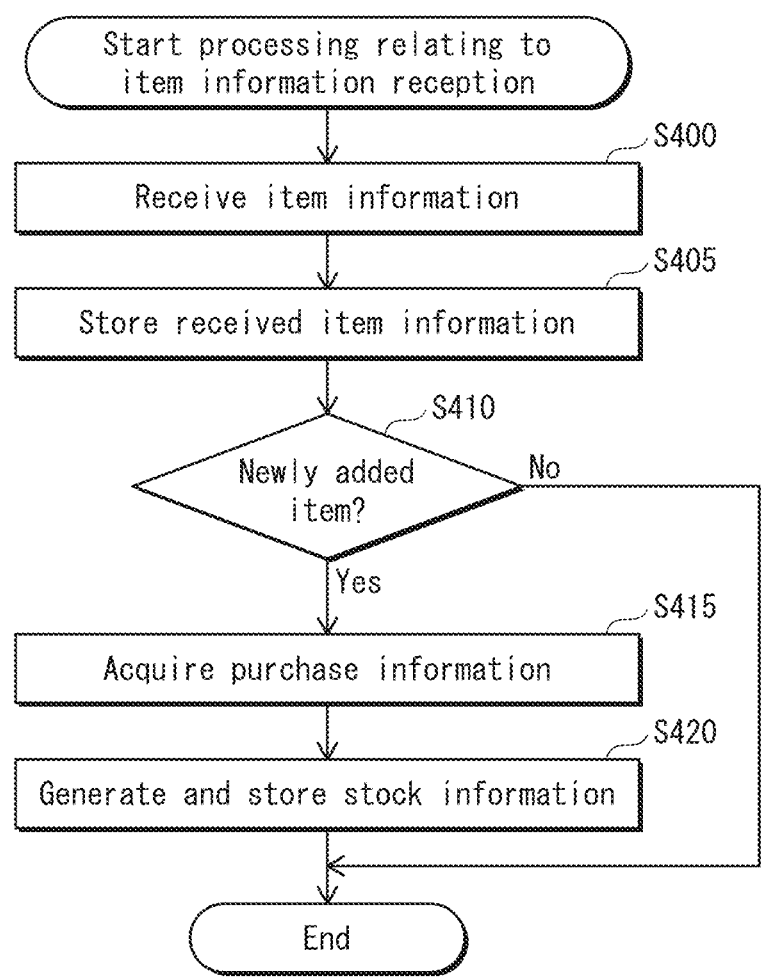
FIG. 27 is a flow diagram illustrating operation of the server 1101 when item information is received.

The following explains, with reference to the flow diagram illustrated in FIG. 27, processing when the server 1101 receives clothing item information transmitted from the camera-equipped device 1102.

The transmission-reception unit 1211 of the server 1101 receives a set of clothing item information from the camera-equipped device 1102, via the Internet 110 (Step S400).

The item information acquisition unit 1207 of the server 1101 stores the clothing item information which is received in the item information table T1500 (Step S405).

The stock information generation unit 1208 of the server 1101 judges whether or not an item of clothing to which the clothing item information relates is a newly added item of clothing (Step S410). More specifically, the stock information generation unit 1208 judges whether or not the add button T1505 included in the received clothing item information indicates "Yes". When the add button T1505 indicates "Yes", the stock information generation unit 1208 judges that the item of clothing to which the clothing item information relates is a newly added item of clothing. When the add button T1505 does not indicate "Yes", the stock information generation unit 1208 judges that the item of clothing to which the clothing item information relates is not a newly added item of clothing When the stock information generation unit 1208 judges that the item of clothing to which the clothing item information relates is a newly added item of clothing (Step S410: Yes), the stock information generation unit 1208 acquires a set of clothing purchase information from the purchase information table T1400 which includes a user ID and an item name that respectively match a user ID and an item name included in the clothing item information (Step S415).

The stock information generation unit 1208 uses the acquired clothing purchase information and the received clothing item information in order to generate a set of clothing stock information, and stores the clothing stock information in the stock information table T600 (Step S420).

When the stock information generation unit 1208 judges that the item of clothing to which the clothing item information relates is not a newly added item of clothing (Step S410: No), processing illustrated in FIG. 27 ends.

(3) Processing for Notification Transmission

Figure 28:
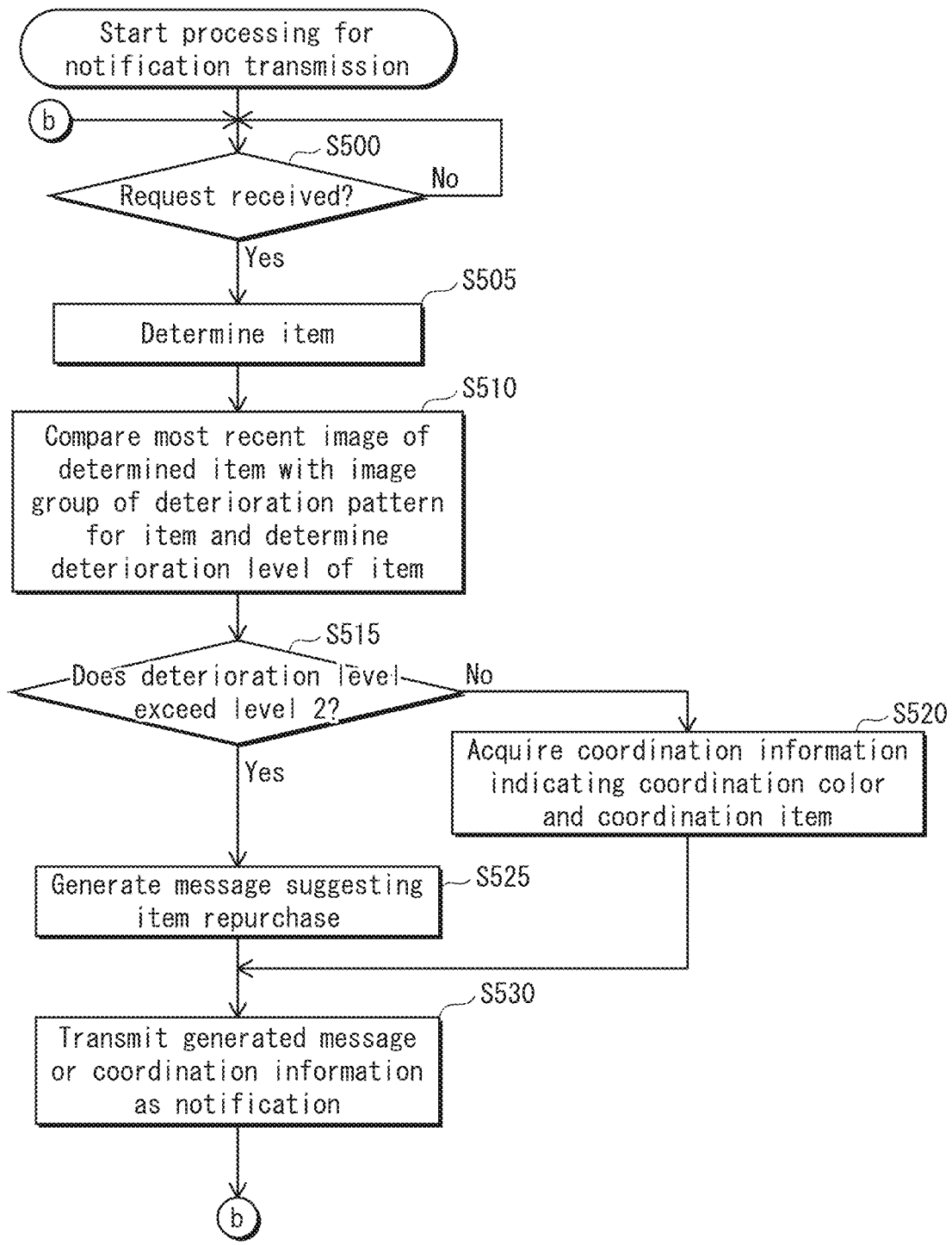
FIG. 28 is a flow diagram illustrating processing for notification acquisition in the information-providing system 1000.

The following explains, with reference to the flow diagram illustrated in FIG. 28, processing for acquiring and transmitting a notification relating to an item of clothing when the server 1101 receives a request relating to the item of clothing from the user terminal 1103.

The transmission-reception unit 1211 of the server 1101 judges whether or not a request related to an item of clothing, transmitted from the user terminal 1103, has been received (Step S500).

When the transmission-reception unit 1211 judges that a request has been received (Step S500: Yes), the notification acquisition unit 1209 of the server 1101 determines an item of clothing which is indicated by an item name included in the received request (Step S505). When the transmission-reception unit 1211 judges that a request has not been received (Step S500: No), the notification acquisition unit 1209 remains on standby for reception of a request.

The quality determination unit 1210 of the server 1101 determines current condition (deterioration level) of the item of clothing determined in Step S505 using a most recent image of the item of clothing and a deterioration pattern group for the item of clothing (Step S510). More specifically, the quality determination unit 1210 acquires a deterioration pattern group from the quality pattern storage unit 1206 having an item name that matches an item name included in the request, and also acquires a set of clothing item information from the item information table T1500 of the stock information storage unit 1205 which includes a user ID and an item name that respectively match a user ID and the item name included in the request. Note that when one or more sets of clothing item information include the same user ID and the same item name, the quality determination unit 1210 acquires a set of clothing item information including a most recent image capture date among the one or more sets of clothing item information. The quality determination unit 1210 determines deterioration level of the item of clothing for which a notification is being requested by comparing an image included in the acquired clothing item information with the acquired deterioration pattern group. Note that when determining deterioration level, if the image capture date included in the clothing item information is at least a predetermined number of days prior to reception of the request, the quality determination unit 1210 sets a current deterioration level of the item of clothing by adding a predetermined value to the deterioration level which is determined.

The notification acquisition unit 1209 judges whether the deterioration level of the item of clothing, determined in Step S510, exceeds level 2 (Step S515).

When the notification acquisition unit 1209 judges that the deterioration level of the item of clothing does not exceed level 2 (Step S515: No), the notification acquisition unit 1209 acquires information relating to a coordination color and a coordination item name for the item of clothing from the vending information table T1200 (Step S520). More specifically, the notification acquisition unit 1209 determines color of the item of clothing from a most recently captured image of the item of clothing, and acquires a set of clothing vending information from the vending information table T1200 which includes an item name and a color that respectively match the item name included in the request and the color which is determined. The notification acquisition unit 1209 acquires coordination information including a coordination color and a coordination item name included in the acquired clothing vending information.

When the notification acquisition unit 1209 judges that the deterioration level of the item of clothing exceeds level 2 (Step S515: Yes), the notification acquisition unit 1209 generates a message suggesting repurchase of the item of clothing (Step S525). More specifically, the notification acquisition unit 1209 stores in advance model text which can be used to complete the message simply by insertion of an item name. Thus, the notification acquisition unit 1209 acquires the message to be transmitted by inserting the item name indicated by the user into the prestored model text.

The notification acquisition unit 1209 subsequently transmits a notification to the user terminal 1103 (Step S530). In terms of the notification in Step S530, when the notification acquisition unit 1209 acquires the coordination information in Step S520, the notification acquisition unit 1209 uses the acquired coordination information as the notification, and when the notification acquisition unit 1209 generates the message in Step S525, the notification acquisition unit 1209 uses the generated message as the notification.

2.6 Display Examples

The following explains examples of notifications displayed by a display unit of the user terminal 1103.

Figure 29:
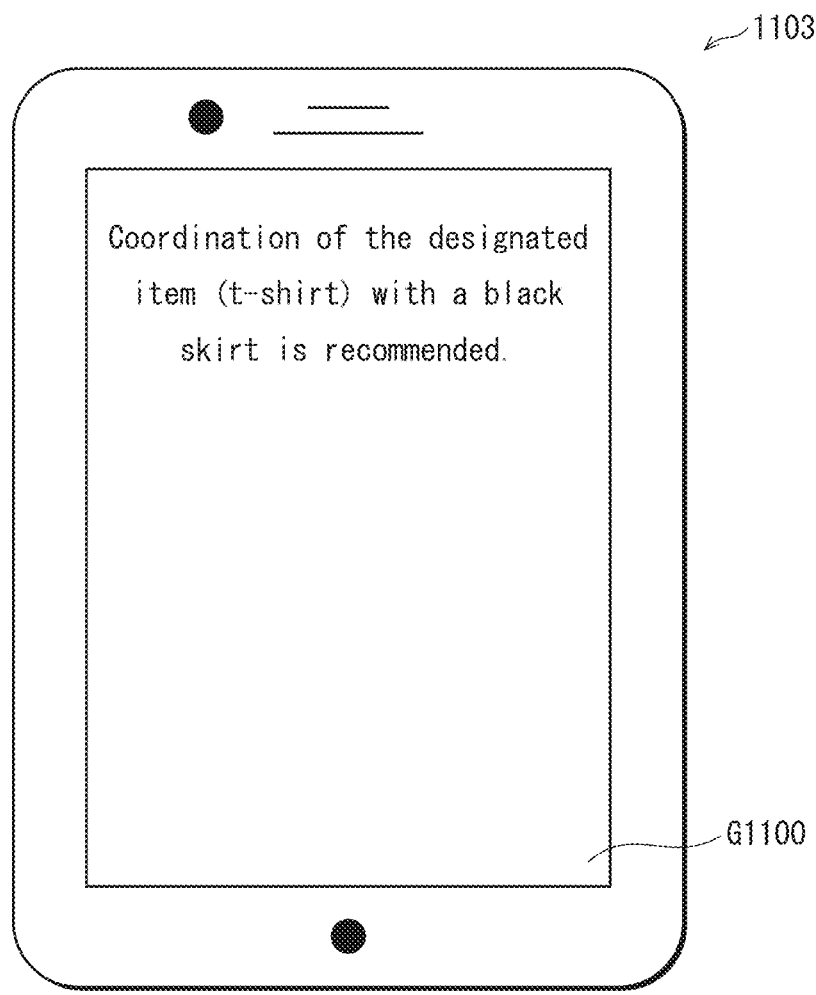
FIG. 29 illustrates one example of a notification provided on a display screen when deterioration level of an item does not exceed level 2.

FIG. 29 illustrates an example of a notification (coordination information) displayed on a screen when the server 1101 judges that deterioration level of a t-shirt does not exceed level 2. For example, when an item of clothing indicated by a user matches an item name and a color included in a set of vending information T1250 illustrated in FIG. 21, the server 1101 uses, as the notification, coordination information which includes the coordination color T1208 (i.e., "Black") and the coordination item name T1209 (i.e., "Skirt") included in the vending information T1250, and transmits the notification to the user terminal 1103. The user terminal 1103 receives the notification (coordination information), and the display unit of the user terminal 1103 displays the notification (refer to screen G1100 in FIG. 29).

Figure 30:
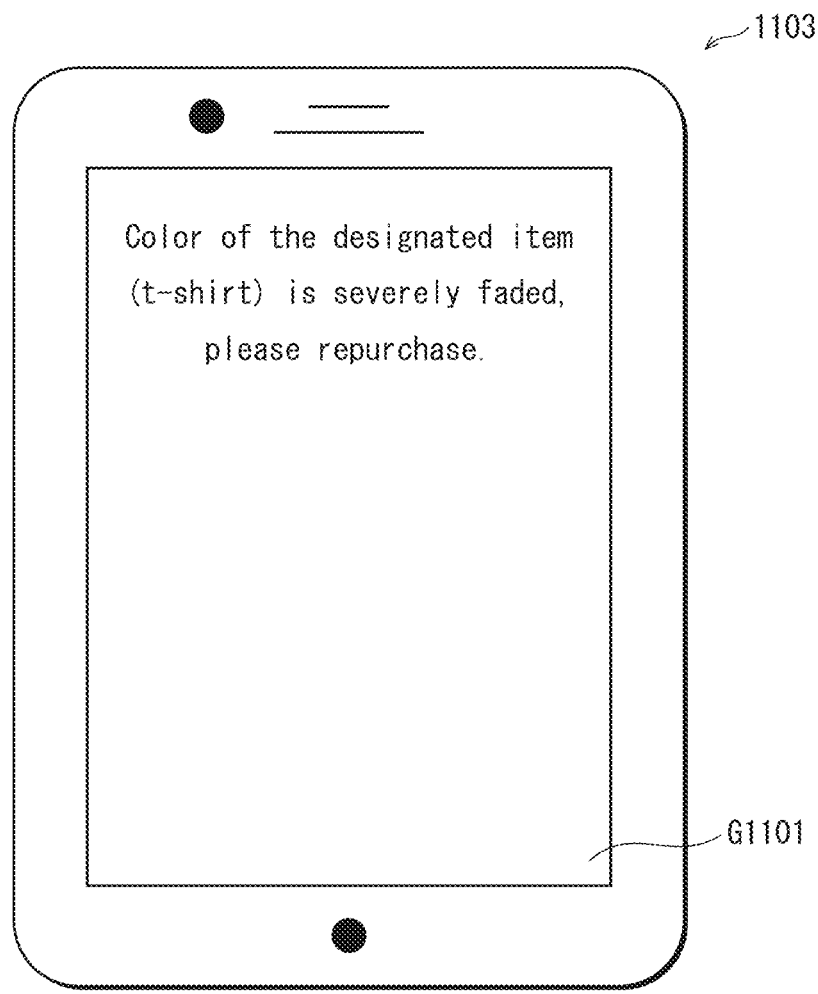
FIG. 30 illustrates one example of a notification provided on a display screen when deterioration level of an item exceeds level 2.

FIG. 30 illustrates an example of a notification displayed on a screen when the server 1101 judges that deterioration level of a t-shirt exceeds level 2. In such a situation, the server 1101 uses a message suggesting repurchase as the notification, and transmits the notification to the user terminal 1103. The user terminal 1103 receives the notification (message) and the display unit of the user terminal 1103 displays the notification (refer to screen G1101 in FIG. 30).

3. Modified Examples

The present invention is explained above based on the first and second embodiments, but the present invention is of course not limited to the first and second embodiments. For example, modified examples such as described below may also be considered.

3.1 First Modified Example

(1) Information-Providing System Relating to First Modified Example

In the first embodiment, the information-providing system 100 provides a notification to a user in accordance with deterioration level of an item, which indicates deterioration in quality of the item, but the above is not a limitation.

In the present invention, the notification is information that is provided to a user in accordance with change in condition of an item.

The notification that is in accordance with change in condition of the item may alternatively be a notification that is provided to a user in accordance with remaining amount of the item.

The following explains an information-providing system relating to the present modified example, which provides a user with a notification in accordance with remaining amount of an item.

In the same way as the information-providing system relating to the first embodiment, the information-providing system relating to the present modified example includes a server, a camera-equipped device, a user terminal, a purchase completion terminal, and a store terminal.

The camera-equipped device, the user terminal, the purchase completion terminal, and the store terminal in the present modified example are the same as the correspondingly named configuration elements in the first embodiment. Therefore, explanation of the aforementioned configuration elements is omitted.

The following explains the server relating to the present modified example.

Configuration elements of the server relating to the present modified example are basically the same as configuration elements of the server 101 relating to the first embodiment, however the server relating to the present modified example includes an amount determination unit in place of the quality determination unit 210 included in the server 101. Furthermore, a notification acquisition unit included in the server relating to the present modified example, which generates a notification, differs in terms of function to the notification acquisition unit 209 included in the server 101 relating to the first embodiment.

The following explains functions of the notification acquisition unit and the amount determination unit in the present modified example. Note that where necessary, the following explanation refers to configuration elements and tables explained in the first embodiment.

(1-1) Notification Acquisition Unit Relating to First Modified Example

In the present modified example, the notification acquisition unit acquires a notification in accordance with remaining amount of an item owned by a user. The notification acquisition unit provides the notification to the user via the Internet 110.

More specifically, the notification acquisition unit relating to the present modified example has functions explained below.

In the present modified example, the notification acquisition unit acquires a request from the user terminal via the Internet 110.

The notification acquisition unit outputs the request, acquired from the user terminal, to the amount determination unit relating to the present modified example.

The notification acquisition unit acquires, from the amount determination unit, a remaining amount of an item owned by the user which corresponds to an item name included in the request.

The notification acquisition unit acquires, in accordance with the remaining amount acquired thereby, a notification to be provided to the user for the item indicated by the item name included in the request. In the present modified example, the notification acquisition unit for example acquires the notification, in accordance with the remaining amount, by generating the notification or by using, as the notification, one or more sets of recipe information stores in the recipe information storage unit 203, which are each for a recipe that uses the item as an ingredient.

The notification acquisition unit transmits the notification acquired thereby, via the Internet 110, to the user terminal which transmitted the request.

(1-2) Amount Determination Unit Relating to First Modified Example

In the present modified example, the amount determination unit determines condition (remaining amount) of an item owned by a user.

When the amount determination unit receives a request from the notification acquisition unit, the amount determination unit acquires a set of stock information from the stock information table T600 which includes an item name that matches an item name included in the request.

The amount determination unit acquires a purchase amount/number and a remaining proportion included in the stock information acquired thereby. The amount determination unit acquires (determines) a current condition (remaining amount) of the item by calculating the product of the purchase amount/number multiplied by the remaining proportion. For example, in a situation in which three tomatoes have been purchased and a remaining proportion of the tomatoes is 33%, a remaining amount of 1 can be acquired by performing a calculation of 3×0.33.

The amount determination unit outputs the remaining amount acquired thereby to the notification acquisition unit.

(2) Operation

Figure 31:
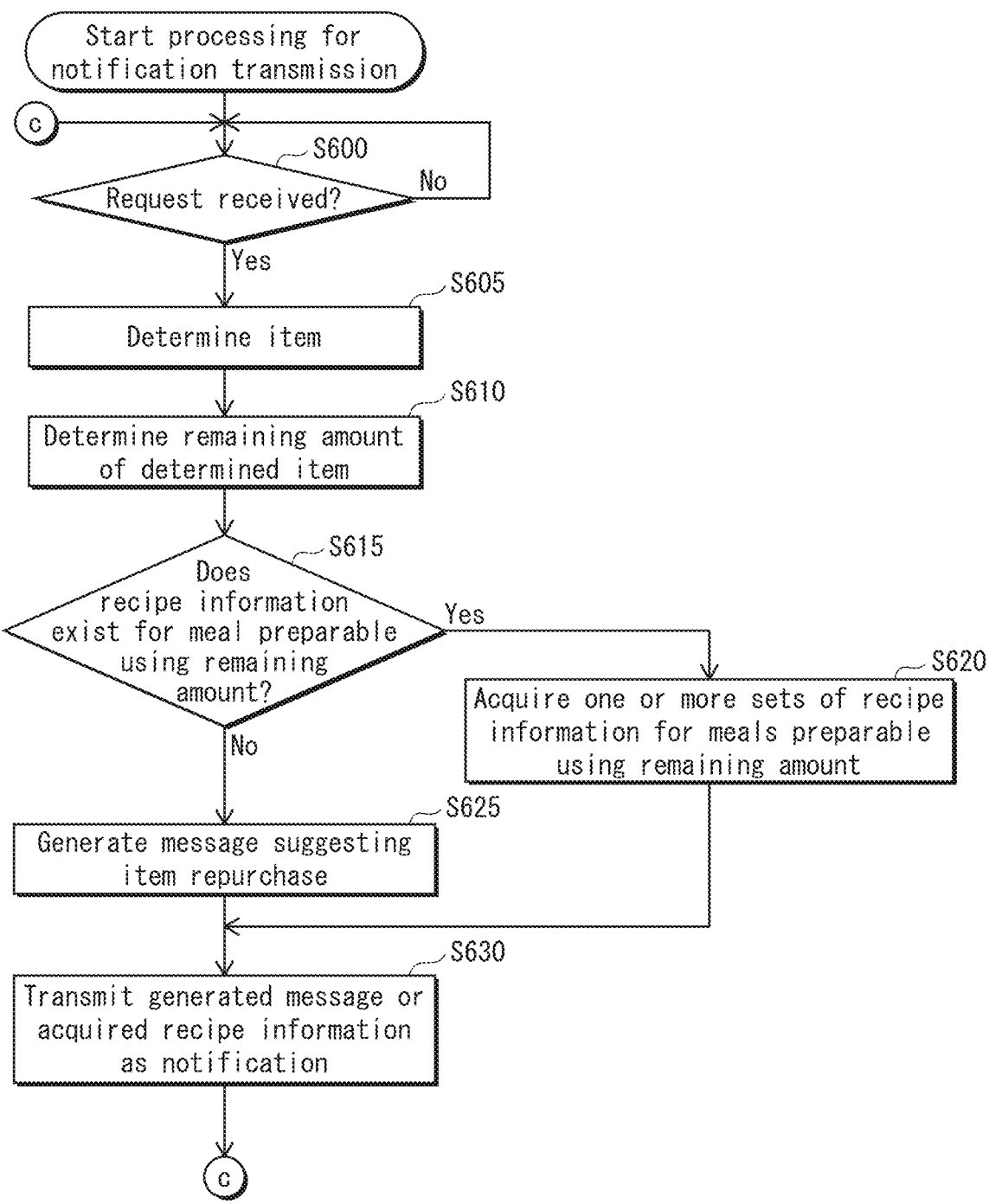
FIG. 31 is a flow diagram illustrating processing for notification acquisition in an information-providing system relating to a first modified example.

The following explains, with reference to the flow diagram illustrated in FIG. 31, processing for acquiring and transmitting a notification when the server relating to the present modified example receives a request from the user terminal.

A transmission-reception unit of the server relating to the present modified example judges whether or not a request transmitted from the user terminal has been received (Step S600).

When judging that a request has been received (Step S600: Yes), the notification acquisition unit relating to the present modified example determines an item indicated by an item name included in the request (Step S605). When judging that a request has not been received (Step S600: No), the notification acquisition unit remains on standby for reception of a request.

The amount determination unit relating to the present modified example determines a remaining amount of the item using a purchase amount/number and a remaining proportion included in a set of stock information which includes an item name that matches the item name included in the received request (Step S610). More specifically, the amount determination unit acquires (determines) a current condition (remaining amount) of the item by calculating a product of the purchase amount/number multiplied by the remaining proportion.

The notification acquisition unit judges whether or not the recipe information table T300 includes one or more sets of recipe information that are each for a recipe that can be prepared using the remaining amount of the item determined in Step S610 (Step S615).

When the notification acquisition unit judges affirmatively (Step S615: Yes), the notification acquisition unit acquires, from the recipe information table T300, the one or more sets of recipe information that are each for a recipe that can be prepared using the remaining amount of the item (Step S620).

When the notification acquisition unit judges negatively (Step S615: No), the notification acquisition unit generates a message suggesting repurchase of the item (Step S625). More specifically, the notification acquisition unit stores in advance model text, linked to information indicating that there is no set of recipe information for a recipe that can be prepared using the remaining amount, which can be used to complete the message simply by insertion of the item name. The notification acquisition unit acquires the message to be transmitted by inserting the item name indicated by the user into the model text which is stored in advance.

The notification acquisition unit subsequently transmits a notification to the user terminal (Step S630). In terms of the notification in Step S630, when the notification acquisition unit acquires the one or more sets of recipe information in Step S620, the notification acquisition unit uses the acquired recipe information as the notification, and when the notification acquisition unit generates the message in Step S625, the notification acquisition unit uses the generated message as the notification.

(3) Further Explanation

In the present modified example, a remaining amount of an item is acquired by performing a calculation using a purchase amount/number and a remaining proportion included in a set of stock information for the item, but the above is not a limitation.

So long as a remaining amount of an item can be acquired by the server, the remaining amount may alternatively be acquired using a different method.

For example, alternatively a remaining amount of an item may be calculated using recipe information acquired from the server or a different server when a user prepares a recipe. More specifically, an amount of the item which is required in order to prepare a recipe indicated by a set of recipe information can be calculated based on amounts of ingredients included in the recipe information and a number of family members, and a remaining amount of the item, after preparing the recipe, can be acquired by subtracting the amount which is calculated from an amount of the item prior to preparing the recipe.

Alternatively, a remaining amount of an item may be acquired by estimating an amount of the item which has been used based on measurement of amounts of cooking ingredients by a microwave or an IH hot-plate.

Further alternatively, the user may notify the server of an amount of an item which has been used during cooking, for example through use of the user terminal.

3.2 Second Modified Example

In the present modified example, explanation is given of an information-providing system for providing a notification to a user based on usage history information relating to an item.

The following explains the information-providing system relating to the present modified example.

The information-providing system relating to the present modified example includes a server, a camera-equipped device, a cooking appliance, a user terminal, a purchase completion terminal, and a store terminal.

The camera-equipped device, the user terminal, the purchase completion terminal and the store terminal in the present modified example are the same as the correspondingly named configuration elements in the first embodiment. Therefore, explanation of the aforementioned configuration elements is omitted.

The following explains the server and the cooking appliance relating to the present modified example.

(1) Cooking Appliance Relating to Second Modified Example

The cooking appliance relating to the second modified example is an appliance used during cooking, such as a mixer, a microwave, an IH hot-plate, or a grill. The cooking appliance is provided with an information terminal which is capable of communicating with the server via the Internet 110. The information terminal of the cooking appliance stores therein appliance information (for example, an ID or a name) for identifying the cooking appliance, and a user ID for identifying a user.

When the cooking appliance relating to the second modified example is used by the user during cooking, the cooking appliance generates a set of usage history information including the appliance information, the user ID of the user, and usage information. The cooking appliance transmits the usage history information generated thereby to the server, via the Internet 110.

For example, when the cooking appliance is a mixer, at least a usage time is included in the usage history information as the usage information. On the other hand, when the cooking appliance is a microwave, a set of usage information including at least a usage time, a recipe, and a temperature setting is included in the usage history information. Furthermore, when the cooking appliance is an IH hot-plate or a grill, a set of usage information including at least a usage time and a temperature setting is included in the usage history information.

(2) Server Relating to Second Modified Example

The server relating to the present modified example is configured by the same elements as the server 101 relating to the first embodiment, however a stock information storage unit, an item information acquisition unit, and a notification acquisition unit included in the server relating to the present modified example, differ in terms of function to the stock information storage unit 205, the item information acquisition unit 207, and the notification acquisition unit 209 included in the server 101.

The following explains respective functions of the stock information storage unit, the item information acquisition unit, and the notification acquisition unit relating to the present modified example. Note that where necessary, the following explanation refers to configuration elements and tables explained in the first embodiment.

The stock information storage unit relating to the present modified example includes a usage history information table in addition to tables explained in the first embodiment (i.e., the item information table T500 and the stock information table T600). The usage history information table stores one or more sets of usage history information.

In addition to functions explained in the first embodiment, the item information acquisition unit relating to the present modified example also has a function of acquiring usage history information from the cooking appliance, via the Internet 110, and storing the usage history information in the usage history information table.

In the present modified example, when the notification acquisition unit receives a request from the user terminal, the notification acquisition unit outputs the request to the quality determination unit 210, and acquires all sets of usage history information in the usage history information table which include a user ID that matches a user ID included in the request. For each set of usage history information which is acquired, the notification acquisition unit determines a meal that has been prepared using the cooking appliance which transmitted the usage history information, based on usage information included in the usage history information. When deterioration level of an item which is a target for a notification does not exceed level 3, the notification acquisition unit acquires one or more sets of recipe information from the recipe information table T300, that are each for a recipe including the item which is the target for the notification, in the same way as in the first embodiment. The notification acquisition unit extracts, from among the one or more sets of recipe information, a set of recipe information for each meal which is determined, and transmits all extracted sets of recipe information to the user terminal as the notification. When a set of recipe information for a determined meal is not extracted from among the one or more sets of recipe information which are acquired, the notification acquisition unit transmits all of the one or more acquired sets of recipe information to the user terminal as the notification.

Note that it is not essential that the notification acquisition unit transmits all extracted sets of recipe information to the user terminal as the notification, and alternatively the notification acquisition unit may only transmit, as the notification, a set of recipe information for a meal which has been most frequently prepared in the past from among the extracted sets of recipe information.

The above configuration enables provision of the notification as recipe information which matches preferences of the user.

3.3 Third Modified Example

In the present modified example, explanation is given for an information-providing system that analyzes whether or not a user has acted in accordance with a notification (i.e., information suggesting repurchase) for an item, after the notification has been provided to the user.

The following explains the information-providing system relating to the present modified example.

The information-providing system relating to the present modified example includes a server, a camera-equipped device, a user terminal, a purchase completion terminal, and a store terminal.

The camera-equipped device, the user terminal, the purchase completion terminal, and the store terminal in the present modified example are the same as the correspondingly named configuration elements in the first embodiment. Therefore, explanation of the aforementioned configuration elements is omitted.

(1) Server 2101

The following explains a server 2101 relating to the present modified example. Note that configuration elements which have the same functions as explained in the first embodiment are labeled using the same reference signs as in the first embodiment, and explanation thereof is omitted.

Figure 32:
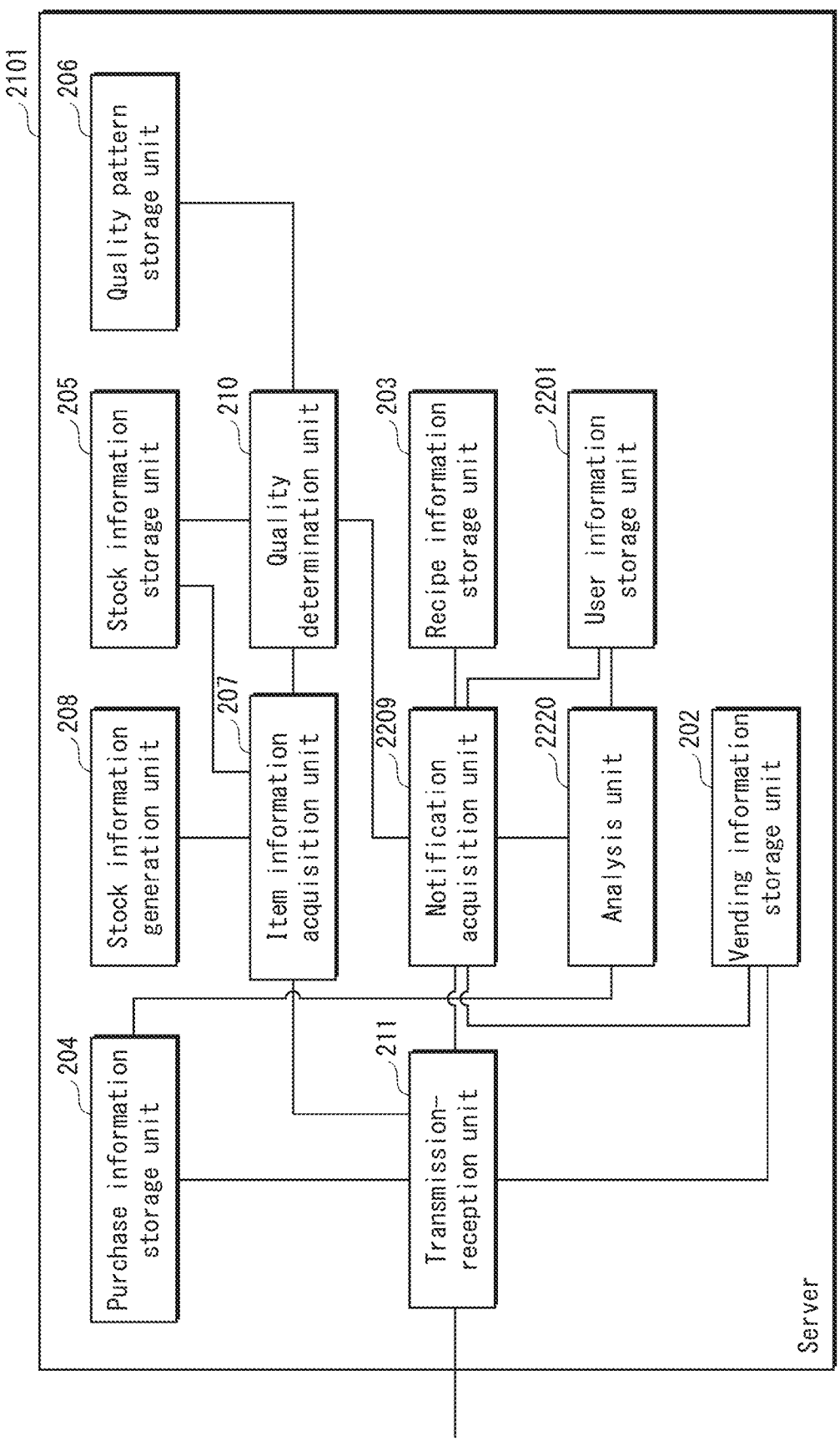
FIG. 32 is a block diagram illustrating configuration of a server 2101.

As illustrated in FIG. 32, the server 2101 is configured by a vending information storage unit 202, a recipe information storage unit 203, a purchase information storage unit 204, a stock information storage unit 205, a quality pattern storage unit 206, an item information acquisition unit 207, a stock information generation unit 208, a quality determination unit 210, a transmission-reception unit 211, a user information storage unit 2201, a notification acquisition unit 2209, and an analysis unit 2220.

The server 2101 includes a processor, a memory, and an NIC, and implements functions of the item information acquisition unit 207, the stock information generation unit 208, the quality determination unit 210, the notification acquisition unit 2209, and the analysis unit 2220 through execution by the processor of a program stored in the memory. The server 2101 uses the NIC to perform transmission and reception of information via the Internet 110.

(1-1) User Information Storage Unit 2201

The user information storage unit 2201 includes an analysis information table T2000, in addition to the user information table T100 explained in the first embodiment.

Data structure of the user information table T100 is the same as explained in the first embodiment, and thus further explanation is omitted.

The following explains the analysis information table T2000.

Figure 33:
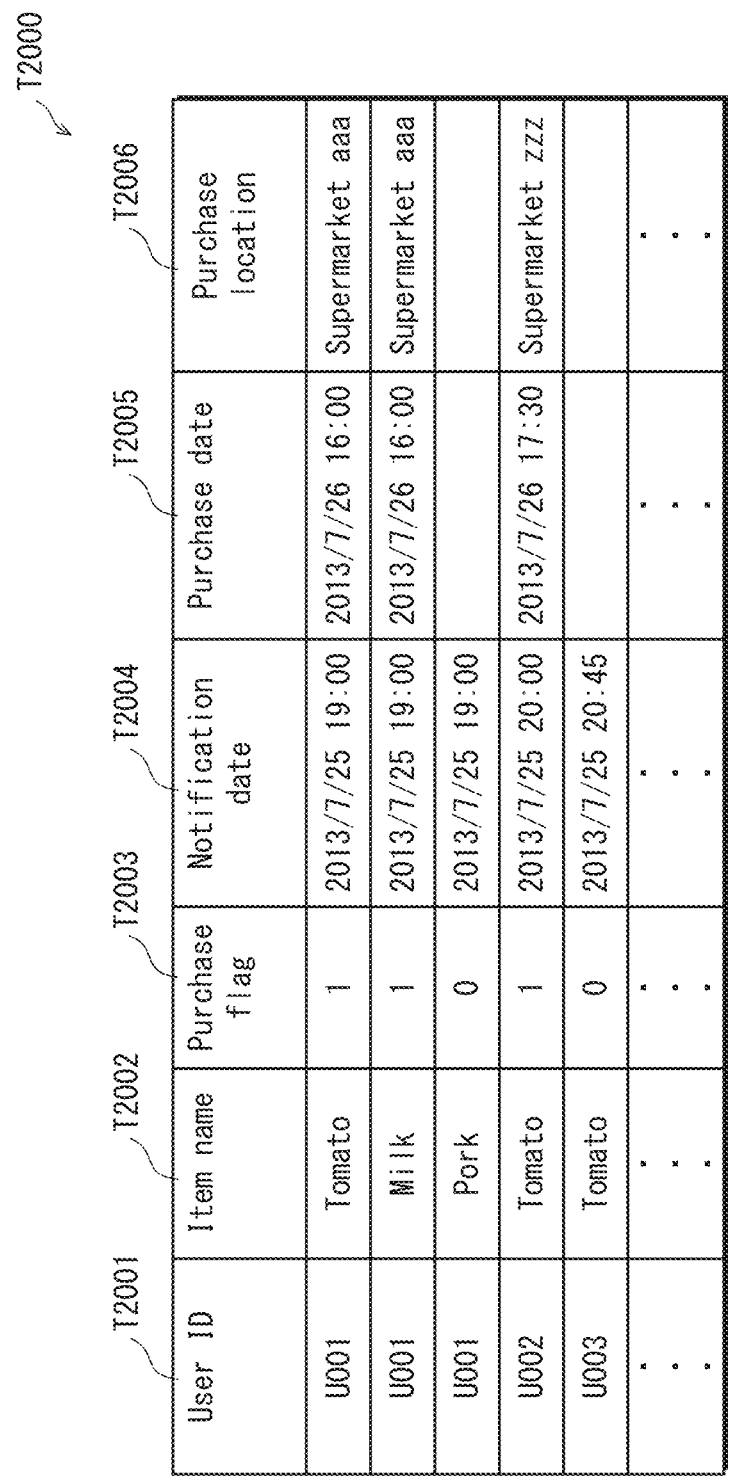
FIG. 33 illustrates one example of data structure of an analysis information table T2000.

As illustrated in FIG. 33, the analysis information table T2000 is a memory region for storing one or more sets of information (herein referred to as analysis information), each including a user ID T2001, an item name T2002, a purchase flag T2003, a notification date T2004, a purchase date T2005, and a purchase location T2006.

The user ID T2001 is an identification code that identifies a user.

The item name T2002 indicates a name of an item purchased by the user identified by the user ID T2001.

The purchase flag T2003 indicates whether the item indicated by the item name T2002 was purchased within a predetermined number of days (for example, one day) of a notification relating to the item being provided to the user. When the item indicated by the item name T2002 is purchased within the predetermined number of days of the notification being provided to the user, the purchase flag T2003 is stored as "1", and when the item is not purchased within the predetermined number of days, the purchase flag T2003 is stored as "0".

The notification date T2004 indicates a date and time at which the notification was provided to the user for the item indicated by the item name T2002. In other words, the notification date T2004 indicates a date and time at which the server 2101 transmitted the notification to the user terminal.

The purchase date T2005 indicates a date and time at which the user purchased the item indicated by the item name T2002.

The purchase location T2006 indicates a store at which the user purchased the item indicated by the item name T2002.

(1-2) Notification Acquisition Unit 2209

In the notification acquisition unit 2209, a function of acquiring a notification differs compared to the notification acquisition unit 209 in the first embodiment.

The following explains the function of acquiring a notification.

In accordance with deterioration level of an item determined by the quality determination unit 210, the notification acquisition unit 2209 acquires one or more sets of recipe information, each for a recipe using the item, acquires one or more sets of vending information, or generates a message indicating that the item should not be used.

When the notification acquisition unit 2209 acquires the vending information or generates the message indicating that the item should not be used, the notification acquisition unit 2209 uses analysis information, managed in the analysis information table T2000, for a user to whom the notification is to be provided. More specifically, when a set of analysis information including an item name of the item which is a target for a notification, is present in analysis information for the user to whom the notification is to be provided, the notification acquisition unit 2209 either acquires the vending information or generates the message, indicating that the item should not be used, in accordance with a value indicated by a purchase flag included in the set of analysis information. More specifically, when the purchase flag indicates a value of "1", the notification acquisition unit 2209 acquires the vending information, and when the purchase flag indicates a value of "0", the notification acquisition unit 2209 generates the message.

The notification acquisition unit 2209 transmits the acquired notification to the user terminal 103 which transmitted the request, via the Internet 110. In accompaniment to the above, the notification acquisition unit 2209 also outputs the notification which is transmitted and a transmission date thereof to the analysis unit 2220.

(1-3) Analysis Unit 2220

After a user has been provided with a notification (i.e., information suggesting repurchase) relating to an item, the analysis unit 2220 judges whether or not the user has acted in accordance with the notification. The analysis unit 2220 has a memory that stores, linked to one another, the notification and the transmission date output from the notification acquisition unit 2209.

When a new set of purchase information is added to the purchase information table T400, if a notification including the same user ID and the same item name as included in the new purchase information is present in the analysis unit 2220, the analysis unit 2220 judges whether a purchase date included in the purchase information is within a predetermined number of days (for example, one day) of the transmission date of the notification. When judging affirmatively, the analysis unit 2220 generates a set of analysis information using the new purchase information and the notification, for which a purchase flag included in the analysis information is set as a value of "1".

Also, when the predetermined period of time passes after transmission of the notification without addition of a corresponding set of purchase information to the purchase information table T400, the analysis unit 2220 generates a set of analysis information, for which a purchase flag is set as a value of "0", and for which a purchase date and a purchase location are left blank.

The analysis unit 2220 stores the analysis information generated thereby in the analysis information table T2000.

(2) Operation

Figure 34:
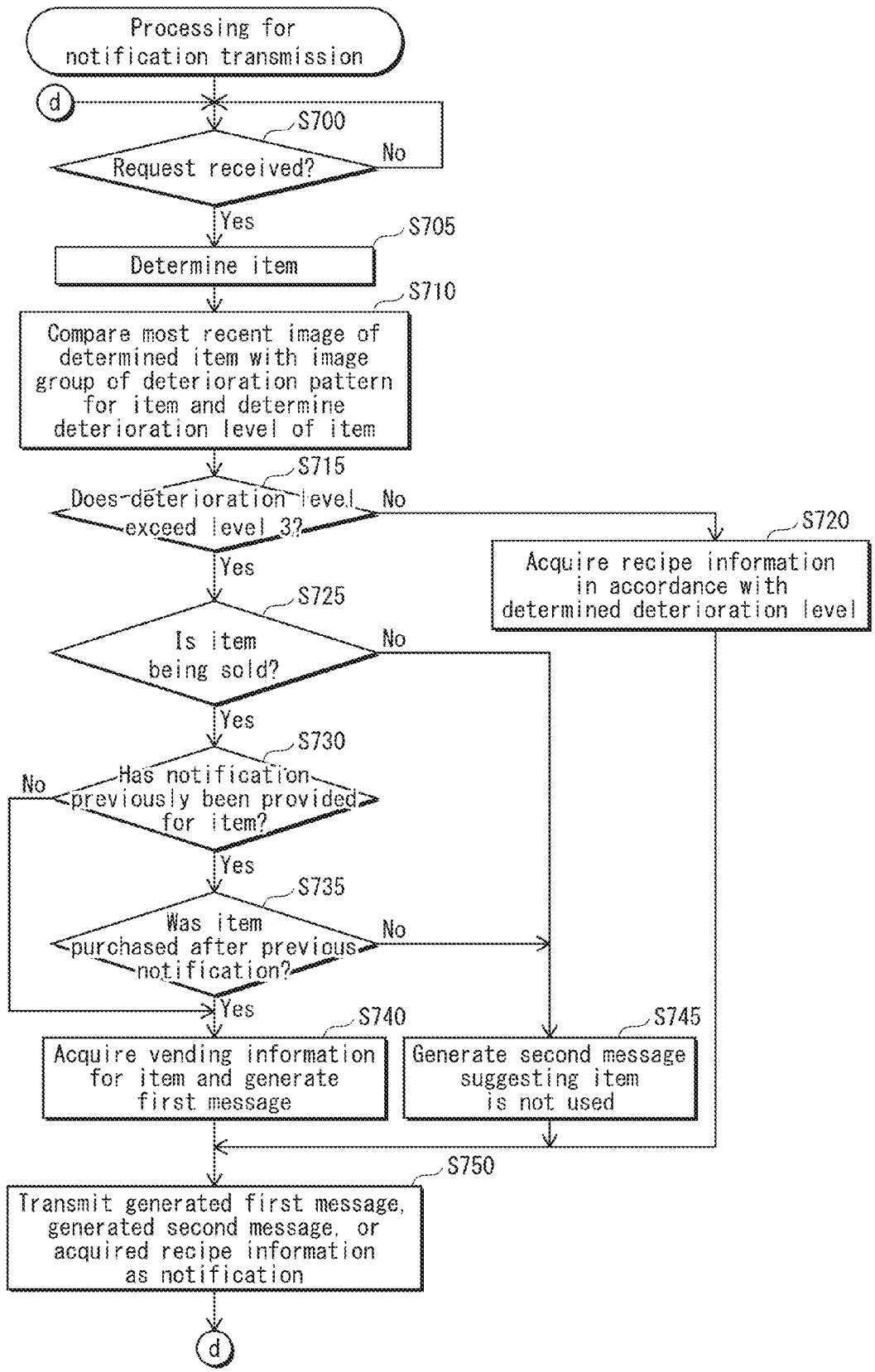
FIG. 34 is a flow diagram illustrating processing for notification acquisition performed by the server 2101.

The following explains, with reference to the flow diagram illustrated in FIG. 34, operation of the server 2101 when acquiring a notification using analysis information.

The transmission-reception unit 211 of the server 2101 judges whether or not a request transmitted from the user terminal has been received (Step S700).

When the transmission-reception unit 211 judges that a request has been received (Step S700: Yes), the notification acquisition unit 2209 of the server 2101 determines an item which is indicated by an item name included in the received request (Step S705). When the transmission-reception unit 211 judges that a request has not been received (Step S700: No), the notification acquisition unit 2209 remains on standby for reception of a request.

The quality determination unit 210 of the server 2101 determines a current condition (deterioration level) of the item determined in Step S705 using a most recent image of the item and a deterioration pattern group for the item (Step S710).

More specific explanation of the above operation is given in the first embodiment, and thus is omitted in the present modified example.

The notification acquisition unit 2209 judges whether the deterioration level, determined for the item in Step S710, exceeds level 3 (Step S715).

When the notification acquisition unit 2209 judges that the deterioration level of the item does not exceed level 3 (Step S715: No), the notification acquisition unit 2209 acquires, in accordance with the deterioration level, one or more sets of recipe information from the recipe information table T300, each for a recipe using the item (Step S720).

When the notification acquisition unit 2209 judges that the deterioration level of the item exceeds level 3 (Step S715: Yes), the notification acquisition unit 2209 judges whether the item is currently being sold (Step S725). More specific explanation of the above operation is given in the first embodiment, and thus is omitted in the present modified example.

When the notification acquisition unit 2209 judges that the item is currently being sold (Step S725: Yes), the notification acquisition unit 2209 judges whether a notification relating to the item has previously been provided to the user (Step S730). More specifically, the notification acquisition unit 2209 judges whether or not a notification for the item is stored in the analysis unit 2220. When a notification has previously been provided for the item, a set of analysis information for the item is also present in the analysis unit 2220.

When the notification acquisition unit 2209 judges that a notification has previously been provided for the item (Step S730: Yes), the notification acquisition unit 2209 judges, using the set of analysis information for the item, whether a purchase of the item has been made (Step S735). More specifically, the notification acquisition unit 2209 judges whether a purchase flag included in the analysis information for the item is set to a value of "1".

When the notification acquisition unit 2209 judges that a purchase has been made by judging that the purchase flag is set to a value of "1" (Step S735: Yes), the notification acquisition unit 2209 acquires one or more sets of vending information for the item and generates the first message (Step S740).

When the notification acquisition unit 2209 judges that the item is not currently being sold (Step S725), or when the notification acquisition unit 2209 judges that a purchase has not been made (Step S735: No), the notification acquisition unit 2209 generates the second message suggesting that the item is not used in cooking (Step S745).

The notification acquisition unit 2209 subsequently transmits a notification to the user terminal (Step S750). In terms of the notification in Step S750, when the notification acquisition unit 2209 acquires one or more sets of recipe information in Step S720, the notification acquisition unit 2209 uses the acquired recipe information as the notification, when the notification acquisition unit 2209 generates the first message in Step S740, the notification acquisition unit 2209 uses the first message as the notification, and when the notification acquisition unit 2209 generates the second message in Step S745, the notification acquisition unit 2209 uses the second message as the notification.

(3) Further Explanation

The server 2101 described above can make appropriate suggestions to a user based on whether or not the user has purchased an item for which a notification (i.e., vending information) has previously been provided to the user. Consequently, the information-providing system relating to the present modified example achieves a higher implementation ratio, indicating a high probability that a suggestion presented by a notification (vending information) is acted upon. Provision of suggestions which have a higher implementation ratio allows a store to plan a more effective commercial strategy.

When providing a notification to a user, the server 2101 described above only uses sets of analysis information for the user from among sets of analysis information for all users, but the above is not a limitation.

Alternatively the server 2101 may use the sets of analysis information for all users, perform further analysis on the analysis information, and notify results thereof to each user.

More specifically, the notification acquisition unit 2209 may acquire all sets of analysis information relating to an item and calculate a proportion of purchase flags included in the analysis information that are set to a value of "1". The aforementioned proportion indicates an implementation ratio for all users.

Also, the notification acquisition unit 2209 may use all sets of analysis information for which the purchase flag is set to a value of "1" in order to generate ranking information that ranks purchase locations (i.e., stores).

The notification acquisition unit 2209 transmits the implementation ratio calculated for all users and the ranking information generated for the purchase locations to a user terminal of each user.

For example, the notification acquisition unit 2209 may periodically (for example, once per day) calculate the implementation ratio, generate the ranking information, and may transmit the implementation ratio and the ranking information, regardless of whether or not a request is received.

3.4 Other Modified Examples

Modified examples such as described below may also be considered.

(1) In the first embodiment, the camera-equipped device 102 receives input from the user of an item name to be included in a set of item information that is transmitted to the server 101, but the above is not a limitation.

Alternatively, the item name which is to be included in the item information may be determined by performing image analysis on a subject included in an image captured by the camera.

Furthermore, in the same way as described above, an item name to be included in a set of clothing item information in the second embodiment may be determined by performing image analysis on a subject included in an image captured by the camera.

The above configuration removes burden of the user being required to input the item name, thus making the information-providing system more user friendly.

(2) In the first embodiment, the stock information generation unit 208 generates a set of stock information when the add button of the camera-equipped device 102 is pressed, and when a set of purchase information is present in the purchase information storage unit 204 which includes a user ID and an item name that respectively match a user ID and an item name included in a set of item information, but the above is not a limitation.

Alternatively, the stock information generation unit 208 may generate a set of stock information when the add button of the camera-equipped device 102 is pressed, even when a set of purchase information is not present in the purchase information storage unit 204 which includes a user ID and an item name that respectively match the user ID and the item name of the item information. In the above situation, the stock information generation unit 208 uses a set of purchase information in which the purchase date T404, the production/harvest date T405, and the expiry/best before/use-by date T406 are left blank, and the purchase amount/number T407 is set by requesting input from the user and setting a value which is input as the purchase amount/number T407. The server 101 performs a request for input of the purchase amount/number T407 with regards to the camera-equipped device 102 or the user terminal 103.

Cooking ingredients are typically purchased at a supermarket or other store, but on occasion a user may receive a cooking ingredient from a third party, for example from a friend. In such a situation, a set of purchase information does not exist for the cooking ingredient which is received, but the cooking ingredient is still an item which is for example stored in a refrigerator, and thus management of change in condition (for example, change in quality) of the item is necessary. Therefore, making an item a target for management when the add button is pressed, even if a set of purchase information relating to the item does not exist, in the same way as described above, enables a notification to be provided to the user for a greater number of different items.

(3) When generating a set of clothing stock information in the second embodiment, a user ID and an item name included in a set of clothing item information are used as search conditions, and a set of clothing purchase information is acquired which includes a user ID and an item name which respectively match the user ID and the item name included in the clothing item information, but the above is not a limitation.

Alternatively, another condition may be added to the search conditions.

Conditions such as clothing color, clothing shape and clothing size may also be used as search conditions. In such a configuration each set of clothing purchase information additionally includes a clothing color, clothing shape, and clothing size. Alternatively, the clothing color, clothing shape, and clothing size may be input into the camera-equipped device 1102 by the user, or may be acquired by the camera-equipped device 1102 through analysis of a captured image. The camera-equipped device 1102 may subsequently include the clothing color, clothing shape, and clothing size in a set of clothing item information transmitted to the server 1101.

The above enables a finer degree of searching (4) In the second embodiment, the item which is a target for a notification is an item of clothing, but the item is not limited to being an item of clothing Alternatively, any other accessory worn by a user, such as jewelry, a watch, or a bag, may be a target for a notification. In other words, an item which is a target for a notification in the second embodiment may be any item which is worn by a user.

(5) In the second embodiment, a notification (coordination information) is acquired for provision to a user based only on deterioration level of an item (item of clothing), but the above is not a limitation.

Alternatively, the notification (coordination information) may be acquired and provided to the user based on usage history information relating to the item.

In such a configuration, a server relating to the present modified example includes a usage history information table T3000, in addition to elements configuring the server 1101 described in the second embodiment.

As illustrated in FIG. 35, the usage history information table T3000 includes a region that stores one or more sets of information (herein referred to as usage history information), each including a date T3001, a top T3002, a trousers/skirt T3003, a belt T3004, a bag T3005, a watch T3006, a hair accessory T3007, and earrings T3008.

The date T3001 indicates a date on which items included in the set of usage history information, such as a top, are coordinated.

The top T3002 indicates a type of top (for example, a t-shirt, a y-shirt, or a sweater) that is used in clothing coordination. Note that for convenience, different types of tops are indicated by alphabetical letters such as "A", "B", and "C".

The trousers/skirt T3003 indicates a type of trousers or skirt (for example, a long skirt, a mini-skirt, or chino pants) that is used in clothing coordination. Note that for convenience, different types of trousers and skirts are indicated by alphabetical letters such as "a", "b", and "c".

The belt T3004 indicates shape of a belt (for example, a buckle shaped belt) that is used in clothing coordination. Note that for convenience, different types of belts are indicated by alphabetical letters such as "v" and "s".

The bag T3005 indicates shape, color, or a combination thereof of a bag that is used in clothing coordination. Note that for convenience, different shapes or colors of bags are indicated by alphabetical letters such as "V" and "S".

The watch T3006 indicates shape of a watch that is used in clothing coordination. Note that for convenience, different shapes of watches are indicated by alphabetical letters such as "G" and "H".

The hair accessory T3007 indicates shape of a hair accessory that is used in clothing coordination. Note that for convenience, different shapes of hair accessories are indicated by alphabetical letters such as "P", "Q", and "R".

The earrings T3008 indicates shape of earrings that are used in clothing coordination. Note that for convenience, different shapes of earrings are indicated by alphabetical letters such as "N" and "M".

The server uses the usage history information when acquiring coordination information to be used as a notification. For example, when an item of clothing indicated by a set of clothing item information is a t-shirt (top "A" in FIG. 35), the server acquires, as coordination information, an item of clothing among trousers/skirts in the usage history information table T3000 which has been most frequently coordinated with the top "A" (i.e., trousers/skirt "a" in FIG. 35), and provides the coordination information to the user.

Through the above configuration, the server relating to the present modified example is able to provide the user with coordination information which focuses on the user's preferred items of clothing, which are items of clothing that the user frequently wears.

The server may also use the usage history information when acquiring a notification which suggests repurchase of an item of clothing. Through such a configuration, the server relating to the present modified example is able to provide the user with a purchasing suggestion for an item of clothing having the same design as the user's preferred items of clothing.

(6) In the first and second embodiments, the server receives a request from the user terminal and provides a notification to the user in response, but the above is not a limitation.

(6-1) Periodical Transmission

Alternatively, the server may provide a notification to a user periodically. For example, the server may generate a notification and provide the notification to the user at a predetermined time every day. In such a configuration, at the predetermined time, the server determines deterioration level of an item that has been indicated in advance by the user, using an image having a most recent capture date relative to the predetermined time. The server subsequently acquires a notification for the item in accordance with the deterioration level which is determined, and provides the notification to the user.

Through the above, the server is able to periodically provide the user with notifications relating to the item.

(6-2) Transmission Upon Visitation of a Specific Location

Alternatively, the server may provide a user with a notification when the user visits a store at which the user is a regular customer.

The following explains implementation of the present modified example.

The server adds store location information (information composed of a longitude and a latitude) to the user information table T100 for a store indicated by the used store T104.

The user terminal has a GPS (Global Positioning System) function of periodically acquiring location information (information composed of a longitude and a latitude) of the user terminal. The user terminal notifies information to the server including the location information and a user ID.

When the server receives the notified information, the server judges whether a location indicated by the location information included in the notified information matches a location indicated by the store location information. When judging affirmatively, the server acquires a notification and transmits the notification to the user terminal.

Note that instead of judging whether locations exactly match in the above judgment, the server may alternatively judge whether the location indicated by the location information included in the notified information is within a predetermined range (for example, within 100 m) of the location indicated by the store location information.

(7) In the first embodiment, the camera 301 of the camera-equipped device 102 is used while being held by the user, but the above is not a limitation.

Alternatively, the camera 301 may be attached to the user terminal (refrigerator) 302.

(8) In the first and second embodiments, the camera-equipped device and the user terminal are separate devices, but the above is not a limitation.

Alternatively, the camera-equipped device and the user terminal may be configured as a single device.

(9) The embodiments and modified examples described above may alternatively be combined.

4. Supplementary Explanation (1) One aspect of the present invention is an information-providing method for implementing, on a computer system, a notification service that provides a notification relating to an item owned by a user, wherein the computer system stores therein a plurality of notifications that are each linked to one of a plurality of levels expressing possible conditions of the item, the plurality of levels including at least a first level at which condition of the item is suitable for using the item as a material for a certain objective and a second level at which condition of the item is not suitable for using the item as the material, and the notifications indicate suggestions to be provided to the user in accordance with a level, among the plurality of levels, corresponding to condition of the item, the information-providing method comprising: an acquisition step of acquiring condition information indicating change in condition of the item resulting from aging or use thereof; a judgment step of judging whether a current time is a provision time at which a notification is to be provided to the user; and a determination step of, upon judging affirmatively in the judgment step, selecting a level that matches condition of the item at the provision time from among the plurality of levels, based on the condition information, and determining a notification linked to the level which is selected, to be the notification that is provided to the user.

Through the configuration described above, the information-providing method ensures that at the provision time when the notification relating to the item is to be provided to the user, the notification which is provided is in accordance with a level corresponding to condition of the item, after change in condition of the item has occurred.

(2) Alternatively, each of the plurality of levels may be a deterioration level indicating a degree of deterioration in quality of the item, each of the deterioration levels may be linked to a piece of appearance information indicating effect on external appearance of the item when deterioration occurs to the degree indicated by the deterioration level, the condition information may include an image of the item and a capture time at which the image is captured by a camera, and in the determination step, a deterioration level most closely matching condition of the item at the provision time may be selected from among the plurality of deterioration levels by comparing, with the pieces of appearance information linked to the deterioration levels, an image having a most recent capture time among images included in condition information acquired up until judging affirmatively in the judgment step.

Through the above configuration, the information-providing method determines the deterioration level of the item using the image of the item which is judged to have been captured most recently at the provision time, and using the pieces of appearance information for the item which are linked to the plurality of deterioration levels. Therefore, the information-providing method can provide the notification to the user in accordance with deterioration level of the item at the provision time.

(3) Alternatively, each of the pieces of appearance information may be a reference image visually indicating effect on external appearance of the item when deterioration occurs to the degree indicated by the deterioration level linked thereto, and in the determination step, the image having the most recent capture time may be compared with the reference images.

Through the above configuration, the information-providing method determines the deterioration level of the item using the image of the item which is judged to have been captured most recently at the provision time, and using the plurality of reference images. Therefore, the information-providing method can provide the notification to the user in accordance with deterioration level of the item at the provision time.

(4) Alternatively, the item may be a cooking ingredient, one or more of the notifications may be a recipe that uses the cooking ingredient as a material for an objective of preparing a meal, and in the determination step, when the deterioration level which is selected is lower than a threshold level, a recipe linked to the deterioration level and using the cooking ingredient as a material may be determined to be the notification that is provided to the user, and when the deterioration level which is selected exceeds the threshold level, a warning suggesting that the cooking ingredient not be used or a recommendation suggesting that the cooking ingredient be repurchased may be determined to be the notification that is provided to the user.

Through the above configuration, the information-providing method can provide the notification to the user as the recipe that uses the cooking ingredient, as the warning suggesting that the cooking ingredient is not used, or as the recommendation suggesting repurchase of the cooking ingredient.

(5) Alternatively, the item may be an item of clothing, one or more of the notifications may be a piece of coordination information that proposes using the item of clothing as a material for an objective of clothing coordination, and in the determination step, when the deterioration level which is selected is lower than a threshold level, a piece of coordination information linked to the deterioration level may be determined to be the notification that is provided to the user, and when the deterioration level which is selected exceeds the threshold level, a purchase recommendation suggesting that a replacement item of clothing be purchased may be determined to be the notification that is provided to the user.

Through the above configuration, the information-providing method can provide the notification to the user as the piece of coordination information suggesting clothing coordination using the item of clothing, or as the purchase recommendation suggesting purchase of the replacement item of clothing (6) Alternatively, the item may be a cooking ingredient, the condition information may indicate an amount of the cooking ingredient, one or more of the notifications may be a recipe that uses the cooking ingredient as a material for an objective of preparing a meal and that includes a required amount of the material, in the determination step, up until the provision time, a remaining amount of the cooking ingredient may be calculated for each of the recipes based on the condition information which is acquired and the required amount included in the recipe, and upon judging affirmatively in the judgment step, the first level may be selected as the level matching condition of the cooking ingredient at the provision time when one or more of the recipes includes a required amount that exceeds the remaining amount which is calculated, and the second level may be selected as the level matching condition of the cooking ingredient at the provision time when none of the recipes includes a required amount that exceeds the remaining amount which is calculated.

Through the above configuration, the information-providing method can, when judging that the current time is the provision time at which the notification is to be provided to the user, provide the notification to the user based on the remaining amount of the cooking ingredient at the provision time.

(7) Alternatively, in the determination step, when the remaining amount which is calculated satisfies the required amount included in one or more of the recipes, the one or more recipes may be determined to be the notification that is provided to the user, and when the remaining amount which is calculated does not satisfy the required amount in any of the recipes, a recommendation suggesting repurchase of the cooking ingredient may be determined to be the notification that is provided to the user.

Through the above configuration, the information-providing method can provide the notification to the user as the recipe that can be prepared using the remaining amount of the cooking ingredient, or as the recommendation suggesting repurchase of the cooking ingredient.

(8) Alternatively, in the judgment step, the current time may be judged to be the provision time upon reception of a request from the user.

Through the above configuration, the information-providing method can, upon the request being received from the user, provide a notification to the user which is linked to the level matching condition of the item at the provision time.

(9) Alternatively, in the judgment step, the current time may be judged to be the provision time once a predetermined period of time has elapsed since acquisition of the condition information.

Through the above configuration, the information-providing method can, once the predetermined period of time has passed since acquisition of the condition information, provide a notification to the user which is linked to the level matching condition of the item at the provision time.

The information-providing method and the information-providing system relating to present invention can be utilized with respect to a service for providing a user with a notification relating to an item owned by the user, in accordance with change in condition of the item.

REFERENCE SIGNS LIST 100, 1000 information-providing system
101, 1101, 2101 server
102, 1102 camera-equipped device
103, 1103 user terminal
104, 1104 purchase completion terminal
105, 1105 store terminal
110 Internet
201, 1201, 2201 user information storage unit
202, 1202 vending information storage unit
203 recipe information storage unit
204, 1204 purchase information storage unit
205, 1205 stock information storage unit
206, 1206 quality pattern storage unit
207, 1207 item information acquisition unit
208, 1208 stock information generation unit
207, 1209, 2209 notification acquisition unit
210, 1210 quality determination unit
211, 1211 transmission-reception unit
301, 1322 camera
302 user terminal
311 image capture unit
312 control unit
313, 322 wireless unit
321, 1321 ID storage unit
323, 1323 input unit
324 amount sensor
325, 1325 control unit
326, 1326 transmission unit
401 ID storage unit
402 input unit
403 control unit
404 display unit
405 transmission-reception unit
2220 analysis unit

The invention claimed is:

1. An information-providing method for implementing, on a computer system, a notification service that provides a notification relating to an item owned by a user, wherein the computer system includes a camera for capturing an image of the item, a non-transitory memory storing a program and a hardware processor that executes the program so as to perform the information-providing method, and the computer system stores therein a plurality of notifications that are each linked to one of a plurality of levels expressing possible conditions of the item, the plurality of levels including at least a first level at which condition of the item is suitable for using the item as a material for a certain objective and a second level at which condition of the item is not suitable for using the item as the material, and the notifications indicate suggestions to be provided to the user in accordance with a level, among the plurality of levels, corresponding to condition of the item, the information-providing method comprising:

an acquisition step of acquiring, using the hardware processor, condition information indicating change in condition of the item resulting from aging or use thereof;

a judgment step of judging, using the hardware processor, whether a current time is a provision time at which a notification is to be provided to the user; and a determination step of, using the hardware processor and upon judging affirmatively in the judgment step, selecting a level that matches a condition of the item at the provision time from among the plurality of levels, based on the condition information, and determining a notification linked to the level which is selected, to be the notification that is provided to the user, wherein each of the plurality of levels is a deterioration level indicating a degree of deterioration in quality of the item, the item is an item of clothing, and one or more of the notifications is a piece of coordination information that suggests using the item of clothing as a material for an objective of clothing coordination, each of the deterioration levels is linked to a piece of appearance information indicating effect on external appearance of the item when deterioration occurs to a degree indicated by the deterioration level, the condition information includes the image of the item and a capture time at which the image is captured by the camera, and in the determination step, a deterioration level most closely matching condition of the item at the provision time is selected from among the plurality of deterioration levels by comparing, with the pieces of appearance information linked to the deterioration levels, an image having a most recent capture time among images included in condition information acquired up until judging affirmatively in the judgment step.

2. The information-providing method of claim 1, wherein each of the pieces of appearance information is a reference image visually indicating effect on external appearance of the item when deterioration occurs to the degree indicated by the deterioration level linked thereto, and in the determination step, the image having the most recent capture time is compared with the reference images.

3. The information-providing method of claim 2, wherein the item is a cooking ingredient, one or more of the notifications is a recipe that uses the cooking ingredient as a material for an objective of preparing a meal, and in the determination step, when the deterioration level which is selected is lower than a threshold level, a recipe linked to the deterioration level and using the cooking ingredient as a material is determined to be the notification that is provided to the user, and when the deterioration level which is selected exceeds the threshold level, a warning suggesting that the cooking ingredient not be used or a recommendation suggesting that the cooking ingredient be repurchased is determined to be the notification that is provided to the user.

4. The information-providing method of claim 2, wherein when the deterioration level which is selected exceeds the threshold level, a purchase recommendation suggesting that a replacement item of clothing be purchased is determined to be the notification that is provided to the user.

5. The information-providing method of claim 1, wherein the item is a cooking ingredient, the condition information indicates an amount of the cooking ingredient, one or more of the notifications is a recipe that uses the cooking ingredient as a material for an objective of preparing a meal and that includes a required amount of the material, in the determination step, up until the provision time, a remaining amount of the cooking ingredient is calculated based on the condition information which is acquired, and upon judging affirmatively in the judgment step, the first level is selected as the level matching condition of the cooking ingredient at the provision time when one or more of the recipes includes a required amount that does not exceed the remaining amount which is calculated, and the second level is selected as the level matching condition of the cooking ingredient at the provision time when none of the recipes includes a required amount that does not exceed the remaining amount which is calculated.

6. The information-providing method of claim 5, wherein in the determination step, when the remaining amount which is calculated satisfies the required amount included in one or more of the recipes, the one or more recipes are determined to be the notification that is provided to the user, and when the remaining amount which is calculated does not satisfy the required amount in any of the recipes, a recommendation suggesting repurchase of the cooking ingredient is determined to be the notification that is provided to the user.

7. The information-providing method of claim 1, wherein in the judgment step, the current time is judged to be the provision time upon reception of a request from the user.

8. The information-providing method of claim 1, wherein in the judgment step, the current time is judged to be the provision time once a predetermined period of time has elapsed since acquisition of the condition information.

9. An information-providing system for implementing a notification service that provides a notification relating to an item owned by a user, the information-providing system comprising:

a camera for capturing an image of an item;

a non-transitory memory storing a program; and a hardware processor that executes the program and causes the information-providing system to operate as:

a storage unit that stores therein a plurality of notifications that are each linked to one of a plurality of levels expressing possible conditions of the item, the plurality of levels including at least a first level at which condition of the item is suitable for using the item as a material for a certain objective and a second level at which condition of the item is not suitable for using the item as the material, and the notifications indicating suggestions to be provided to the user in accordance with a level, among the plurality of levels, corresponding to condition of the item;

an acquisition unit that acquires condition information indicating change in condition of the item resulting from aging or use thereof;

a judgment unit that judges whether a current time is a provision time at which a notification is to be provided to the user; and a determination that, upon the judging unit judging affirmatively, selects a level that matches condition of the item at the provision time from among the plurality of levels, based on the condition information, and determines a notification linked to the level which is selected, to be the notification that is provided to the user, wherein each of the plurality of levels is a deterioration level indicating a degree of deterioration in quality of the item, the item is an item of clothing, and one or more of the notifications is a piece of coordination information that suggests using the item of clothing as a material for an objective of clothing coordination, each of the deterioration levels is linked to a piece of appearance information indicating effect on external appearance of the item when deterioration occurs to a degree indicated by the deterioration level, the condition information includes an image of the item and a capture time at which the image is captured by the camera, and in the determination unit, a deterioration level most closely matching condition of the item at the provision time is selected from among the plurality of deterioration levels by comparing, with the pieces of appearance information linked to the deterioration levels, an image having a most recent capture time among images included in condition information acquired up until judging affirmatively in the judgment unit.

* * * * *